United States Patent
Shibayama et al.

(10) Patent No.: US 10,206,120 B2
(45) Date of Patent: Feb. 12, 2019

(54) INFORMATION PROCESSING APPARATUS AND NON-TRANSITORY COMPUTER-READABLE RECORDING MEDIUM

(71) Applicant: AGOOP Corp., Tokyo (JP)

(72) Inventors: Kazuhisa Shibayama, Tokyo (JP); Yuji Soga, Tokyo (JP); Yusuke Kato, Tokyo (JP)

(73) Assignee: AGOOP Corp., Tokyo (JP)

( * ) Notice: Subject to any disclaimer, the term of this patent is extended or adjusted under 35 U.S.C. 154(b) by 42 days.

(21) Appl. No.: 15/335,447

(22) Filed: Oct. 27, 2016

(65) Prior Publication Data

US 2017/0048723 A1 Feb. 16, 2017

Related U.S. Application Data

(63) Continuation of application No. PCT/JP2014/002373, filed on Apr. 28, 2014.

(51) Int. Cl.
*G01S 5/00* (2006.01)
*H04W 64/00* (2009.01)
(Continued)

(52) U.S. Cl.
CPC ........... *H04W 16/18* (2013.01); *G01S 5/00* (2013.01); *H04W 64/006* (2013.01); *H04L 43/08* (2013.01)

(58) Field of Classification Search
CPC ............ H04W 16/18; H04W 64/006; H04W 4/021–4/046; H04W 40/20;
(Continued)

(56) References Cited

U.S. PATENT DOCUMENTS

2007/0005419 A1* 1/2007 Horvitz ............... G06Q 30/02
 701/533
2010/0309044 A1* 12/2010 Ische ..................... G01S 19/46
 342/357.28
(Continued)

FOREIGN PATENT DOCUMENTS

JP 2003-249887 A 9/2003
JP 2014-064154 * 4/2014
JP 2014-064154 A 4/2014

OTHER PUBLICATIONS

List of apps uploaded to iPhone App Store and Android GooglePlay related to JP2013-050947 (see attached list).
(Continued)

*Primary Examiner* — Ivan O Latorre

(57) ABSTRACT

A computer is caused to perform a communication environment information acquisition procedure; a procedure that acquires position information; a procedure that, when the computer is located in a positioning-difficult area or in a positioning-inaccurate area, acquires movement information; and a procedure that identifies a position at which the communication environment information acquisition procedure was performed in the positioning-difficult area or the positioning-inaccurate area, based on the movement information and the position information that is measured by the positioning means in a positioning-possible area where the positioning accuracy of the positioning means is higher than a predetermined value after the computer has moved from the positioning-difficult area or the positioning-inaccurate area to the positioning-possible area.

14 Claims, 11 Drawing Sheets

(51) Int. Cl.
*H04W 16/18* (2009.01)
*H04L 12/26* (2006.01)

(58) Field of Classification Search
CPC ............. H04W 40/205; H04W 56/006; H04W 28/0226; H04W 36/32; H04W 48/04; G01S 5/00; H04L 43/08
See application file for complete search history.

(56) References Cited

U.S. PATENT DOCUMENTS

| | | | | |
|---|---|---|---|---|
| 2010/0317390 | A1* | 12/2010 | Rekimoto | H04W 64/00 455/511 |
| 2011/0319094 | A1* | 12/2011 | Usui | G01S 5/0027 455/456.1 |
| 2012/0295641 | A1* | 11/2012 | Tsuda | H04B 7/18547 455/456.6 |
| 2012/0295650 | A1 | 11/2012 | Futaki et al. | |
| 2013/0060933 | A1* | 3/2013 | Tung | G06F 11/3495 709/224 |
| 2013/0099971 | A1* | 4/2013 | Takaoka | G01S 19/24 342/357.74 |
| 2013/0218950 | A1* | 8/2013 | Sakakihara | G06F 15/16 709/203 |
| 2013/0262359 | A1* | 10/2013 | Sambongi | G06N 5/02 706/46 |
| 2013/0267228 | A1* | 10/2013 | Yanagida | G01S 5/0027 455/435.1 |
| 2013/0273934 | A1* | 10/2013 | Meredith | H04W 16/04 455/456.1 |
| 2013/0317944 | A1* | 11/2013 | Huang | G01S 5/0252 705/26.61 |
| 2014/0162693 | A1* | 6/2014 | Wachter | H04W 4/021 455/456.3 |
| 2014/0180626 | A1* | 6/2014 | Kimishima | G01C 22/006 702/142 |
| 2015/0350843 | A1* | 12/2015 | Jensen | H04W 4/029 455/456.3 |

OTHER PUBLICATIONS

List of apps uploaded to iPhone App Store and Android GooglePlay related to JP2012-287569 (see attached list).
International Search Report for International Application No. PCT/JP2014/002373, issued by the Japan Patent Office dated Jul. 15, 2014.
Office Action issued for counterpart Japanese Application 2016-516313, issued by the Japan Patent Office dated Apr. 17, 018.

* cited by examiner

| TERMINAL ID | DATE AND TIME | POSITION INFORMATION | GPS ACCURACY | COMMUNICATION/ENVIRONMENT INFORMATION ||||
|---|---|---|---|---|---|---|
| | | | | COMMUNICATION POSSIBILITY | THROUGHPUT | LATENCY |
| 0001 | 2012/12/10 ... | *** | *** | *** | *** | *** |
| 0001 | 2012/12/10 ... | *** | *** | *** | *** | *** |
| ... | ... | ... | ... | ... | ... | ... |
| 0002 | 2012/12/11 ... | *** | *** | *** | *** | *** |
| 0002 | 2012/12/11 ... | *** | *** | *** | *** | *** |
| ... | ... | ... | ... | ... | ... | ... |
| 0003 | 2012/12/12 ... | *** | *** | *** | *** | *** |
| 0003 | 2012/12/12 ... | *** | *** | *** | *** | *** |

FIG. 3

| 1100 | | | | | | |
|---|---|---|---|---|---|---|
| TERMINAL ID 1110 | TIMING 1120 | POSITIONING INFORMATION 1130 | POSITIONING ACCURACY 1140 | MOVEMENT INFORMATION 1150 | COMMUNICATION ENVIRONMENT INFORMATION 1160 |
| : | : | : | : | : | : |
| 0001 | $t_1$ | $(A_1, B_1, C_1)$ | GOOD | $(a_1, b_1, c_1)$ | ***** |
| 0001 | $t_2$ | $(A_2, B_2, C_2)$ | GOOD | $(a_2, b_2, c_2)$ | ***** |
| 0001 | $t_3$ | $(A_3, B_3, C_3)$ | DIFFICULT | $(a_3, b_3, c_3)$ | ***** |
| 0001 | $t_4$ | — | — | $(a_4, b_4, c_4)$ | ***** |
| 0001 | $t_5$ | — | IMPOSSIBLE | $(a_5, b_5, c_5)$ | ***** |
| 0001 | $t_6$ | — | — | $(a_6, b_6, c_6)$ | ***** |
| 0001 | $t_7$ | $(A_7, B_7, C_7)$ | GOOD | $(a_7, b_7, c_7)$ | ***** |
| 0001 | $t_8$ | $(A_8, B_8, C_8)$ | GOOD | $(a_8, b_8, c_8)$ | ***** |
| : | : | : | : | : | : |

FIG.11

INFORMATION PROCESSING APPARATUS AND NON-TRANSITORY COMPUTER-READABLE RECORDING MEDIUM

The contents of the following PCT patent application are incorporated herein by reference:
NO. PCT/JP2014/002373 filed on Apr. 28, 2014.

BACKGROUND

1. Technical Field

The present invention relates to an information processing apparatus and a non-transitory computer-readable recording medium.

2. Related Art

A method is known for using a wireless communication terminal of a mobile phone or the like to measure line speed of a mobile communication network, such as shown in Patent Document 1, for example.
Patent Document 1: Japanese Patent Application Publication No. 2003-249887

With this measurement method, however, the line speed is measured at a specified time and specified location at which the user accesses the server. Therefore, the time and location at which information for the line speed can be collected is limited, and a communication state close to the actual usage state of the user cannot be known over a wide area. Furthermore, it is difficult to know the change over time of the communication state.

SUMMARY

According to a first aspect of the present invention, provided is a non-transitory computer-readable recording medium storing thereon a program. The program may cause the computer to perform a communication environment information acquisition procedure that acquires information relating to a communication environment of the computer. The program may cause the computer to perform a position information acquisition procedure that acquires position information indicating a position of the computer, from a positioning means that receives a radio wave or signal and measures the position of the computer. The program may cause the computer to perform a movement information acquisition procedure that, when the computer is located in a positioning-inaccurate area where positioning accuracy of the positioning means is lower than a predetermined value or in a positioning-impossible area where the positioning means cannot perform positioning, acquires movement information indicating a movement amount and movement direction of the computer. The program may cause the computer to perform an identification procedure that identifies a position at which the communication environment information acquisition procedure was performed in the positioning-inaccurate area or the positioning-impossible area, based on the movement information and the position information measured by the positioning means in a positioning-possible area where the positioning accuracy of the positioning means is higher than a predetermined value after the computer has moved from the positioning-inaccurate area or the positioning-impossible area to the positioning-possible area.

The program may further cause the computer to perform a log information generation procedure that generates log information in which the position identified by the identification procedure identifying the position where the communication environment information acquisition procedure was performed in the positioning-inaccurate area or the positioning-impossible area is associated with the information relating to the communication environment at the position identified by the identification procedure identifying the position where the communication environment information acquisition procedure was performed in the positioning-inaccurate area or the positioning-impossible area. In the program, the log generation procedure may include generating the log information in which the position information measured by the positioning means in the positioning-possible area is associated with the information relating to the communication environment at the position indicated by the position information measured by the positioning means in the positioning-possible area.

In the program, the identification procedure identifying the position where the communication environment information acquisition procedure was performed in the positioning-inaccurate area or the positioning-impossible area may include calculating differential information indicating the movement amount and the movement direction of the computer between the position indicated by the position information measured by the positioning means in the positioning-possible area and the position where the communication environment information acquisition procedure was performed in the positioning-inaccurate area or the positioning-impossible area, based on the movement information at the position indicated by the position information measured by the positioning means in the positioning-possible area and the movement information at the position where the communication environment information acquisition procedure was performed in the positioning-inaccurate area or the positioning-impossible area. In the program, the identification procedure identifying the position where the communication environment information acquisition procedure was performed in the positioning-inaccurate area or the positioning-impossible area may include identifying the position where the communication environment information acquisition procedure was performed in the positioning-inaccurate area or the positioning-impossible area, based on the calculated differential information and the position information measured by the positioning means in the positioning-possible area.

The program may further cause the computer to judge whether the computer is located in the positioning-inaccurate area or the positioning-impossible area. The program may further cause the computer to, when it is judged that the computer is located in the positioning-inaccurate area or the positioning-impossible area, activate a generation means that generates the movement information indicating the movement amount and the movement direction of the computer. The program may further cause the computer to, when it is judged that the computer is located in the positioning-inaccurate area or the positioning-impossible area, set a positioning interval of the positioning means to be greater than the positioning interval when the computer is located in the positioning-possible area. The program may further cause the computer to judge whether the computer is located in the positioning-possible area. The program may further cause the computer to, when it is judged that the computer is in the positioning-possible area, stop the generation of the movement information by the movement information generating section.

According to a second aspect of the present invention, provided is a non-transitory computer-readable recording medium storing thereon a program. The program may cause the computer to perform a position information acquisition procedure that acquires position information indicating a position of the computer, from a positioning means that receives a radio wave or signal and measures the position of the computer. The program may cause the computer to perform a movement information acquisition procedure that, when the computer is located in a positioning-inaccurate area where positioning accuracy of the positioning means is lower than a predetermined value or in a positioning-impossible area where the positioning means cannot perform positioning, acquires movement information indicating a movement amount and movement direction of the computer, and to perform an identification procedure that identifies a position at which the communication environment information acquisition procedure was performed in the positioning-inaccurate area or the positioning-impossible area, based on the movement information and the position information measured by the positioning means in a positioning-possible area where the positioning accuracy of the positioning means is higher than a predetermined value after the computer has moved from the positioning-inaccurate area or the positioning-impossible area to the positioning-possible area.

According to a third aspect of the present invention, provided is an information processing apparatus. The information processing apparatus may comprise a communication environment information acquiring section that acquires information relating to a communication environment. The information processing apparatus may comprise a positioning information acquiring section that acquires position information indicating a position of the information processing apparatus, from a positioning section that receives a radio wave or signal and measures the position of the information processing apparatus. The information processing apparatus may comprise a movement information acquiring section that, when the information processing apparatus is located in a positioning-inaccurate area where positioning accuracy of the positioning section is lower than a predetermined value or in a positioning-impossible area where the positioning section cannot perform positioning, acquires movement information indicating a movement amount and a movement direction of the information processing apparatus. The information processing apparatus may comprise a position identifying section that identifies a position at which the information relating to the communication environment was acquired in the positioning-inaccurate area or the positioning-impossible area, based on the movement information and the position information that is measured by the positioning section in a positioning-possible area where the positioning accuracy of the positioning section is higher than a predetermined value after the information processing apparatus has moved from the positioning-inaccurate area or the positioning-impossible area to the positioning-possible area.

According to a fourth aspect of the present invention, provided is an information processing apparatus. The information processing apparatus may comprise a positioning information acquiring section that acquires position information indicating a position of the information processing apparatus, from a positioning section that receives a radio wave or signal and measures the position of the information processing apparatus. The information processing apparatus may comprise a movement information acquiring section that, when the information processing apparatus is located in a positioning-inaccurate area where positioning accuracy of the positioning section is lower than a predetermined value or in a positioning-impossible area where the positioning section cannot perform positioning, acquires movement information indicating a movement amount and a movement direction of the information processing apparatus. The information processing apparatus may comprise a position identifying section that identifies a position at which the information relating to the communication environment was acquired in the positioning-inaccurate area or the positioning-impossible area, based on the movement information and the position information that is measured by the positioning section in a positioning-possible area where the positioning accuracy of the positioning section is higher than a predetermined value after the information processing apparatus has moved from the positioning-inaccurate area or the positioning-impossible area to the positioning-possible area.

According to a fifth aspect of the present invention, provided is an information processing method. The information processing method may include performing a communication environment information acquisition procedure that acquires information relating to a communication environment of a computer. The information processing method may include performing a position information acquisition procedure that acquires position information indicating a position of the computer, from a positioning means that receives a radio wave or signal and measures the position of the computer. The information processing method may include performing a movement information acquisition procedure that, when the computer is located in a positioning-inaccurate area where positioning accuracy of the positioning means is lower than a predetermined value or in a positioning-impossible area where the positioning means cannot perform positioning, acquires movement information indicating a movement amount and movement direction of the computer. The information processing method may include performing an identification procedure that identifies a position at which the communication environment information acquisition procedure was performed in the positioning-inaccurate area or the positioning-impossible area, based on the movement information and the position information measured by the positioning means in a positioning-possible area where the positioning accuracy of the positioning means is higher than a predetermined value after the computer has moved from the positioning-inaccurate area or the positioning-impossible area to the positioning-possible area.

According to a sixth aspect of the present invention, provided is an information processing method. The information processing method may include performing a position information acquisition procedure that acquires position information indicating a position of a computer, from a positioning means that receives a radio wave or signal and measures the position of the computer. The information processing method may include performing a movement information acquisition procedure that, when the computer is located in a positioning-inaccurate area where positioning accuracy of the positioning means is lower than a predetermined value or in a positioning-impossible area where the positioning means cannot perform positioning, acquires movement information indicating a movement amount and movement direction of the computer. The information processing method may include performing an identification procedure that identifies a position at which the communication environment information acquisition procedure was performed in the positioning-inaccurate area or the positioning-impossible area, based on the movement information and the position information measured by the positioning means in a positioning-possible area where the positioning accuracy of the positioning means is higher than a predetermined value after the computer has moved from the positioning-inaccurate area or the positioning-impossible area to the positioning-possible area.

According to a seventh aspect of the present invention, provided is a non-transitory computer-readable medium storing thereon a program for acquiring information relating to a communication environment. The program may cause a computer having a communication function to receive user instructions designating execution of a process other than a process for acquiring information relating to the communication environment. The program may cause the computer to execute the process designated by the user instructions. The program may cause the computer to acquire information relating to the communication environment of the computer, when the user instructions are received or when the process indicated by the user instructions is executed. The program may cause the computer to acquire position information of the computer, when the user instructions are received or when the process indicated by the user instructions is executed.

The program may further cause the computer to display an image. In the program, the process other than the process for acquiring the information relating to the communication environment may change a display position of the displayed image. The program may further cause the computer to output information acquired from a server connected to the computer via a network, in a format that can be understood by a user of the computer. In the program, the process other than the process for acquiring the information relating to the communication environment may be a process of acquiring information designated by the user instructions from the server. In the program, acquiring the information relating to the communication environment may include acquiring the information relating to the communication environment based on an amount of information designated by the user and on a time period from when a request to transmit the information designated by the user was issued to the server to when the information designated by the user was acquired from the server.

The program may further cause the computer to generate log information in which the information relating to the communication environment of the computer is associated with the position information of the computer. In the program, acquiring the position information may include acquiring the position information of the computer and information relating to GPS accuracy, based at least on GPS information. In the program, the log information may associate the information relating to the GPS accuracy, the information relating to the communication environment of the computer, and the position information of the computer with each other. The program may further cause the computer to acquire identification information that identifies the computer. In the program, the log information associates the identification information, the information relating to the communication environment of the computer, and the position information of the computer with each other.

The program may further cause the computer to, while in a state where the program is in a background but not operating, acquire position change information indicating that a positional change amount of the computer has exceeded a predetermined value. The program may further cause the computer to, when the position change information has been acquired, transition to a state in which the program operates in the background. The program may further cause the computer to, while in a state where the program is operating in the background, acquire the information relating to the communication environment of the computer. The program may further cause the computer to randomly determine a timing within a predetermined period from when the program transitions to a state of operating in a background from a state of operating in a foreground or a state of being in the background but not operating, at which the computer is to perform the process of acquiring the communication environment information.

In the program, acquiring the position information may include acquiring position information indicating a position of the computer, from a positioning means that receives a radio wave or signal and measures the position of the computer. The program may cause the computer to perform a movement information acquisition procedure that, when the computer is located in a positioning-inaccurate area where positioning accuracy of the positioning means is lower than a predetermined value or in a positioning-impossible area where the positioning means cannot perform positioning, acquires movement information indicating a movement amount and movement direction of the computer. The program may cause the computer to perform an identification procedure that identifies a position at which the communication environment information acquisition procedure was performed in the positioning-inaccurate area or the positioning-impossible area, based on the movement information and the position information measured by the positioning means in a positioning-possible area where the positioning accuracy of the positioning means is higher than a predetermined value after the computer has moved from the positioning-inaccurate area or the positioning-impossible area to the positioning-possible area.

According to an eighth aspect of the present invention, provided is an information processing apparatus that acquires information relating to a communication environment. The information processing apparatus may include a user instruction receiving section that receives user instructions designating execution of a process other than a process for acquiring information relating to the communication environment. The information processing apparatus may include process executing section that executes the process designated by the user instructions. The information processing apparatus may include a communication environment information acquiring section that acquires information relating to the communication environment of the information processing apparatus, when the user instructions are received or when the process indicated by the user instructions is executed. The information processing apparatus may include a position information acquiring section that acquires position information of the information processing apparatus, when the user instructions are received or when the process indicated by the user instructions is executed.

According to a ninth aspect of the present invention, provided is a method for acquiring information relating to a communication environment of an information processing apparatus. The method may include receiving user instructions designating execution of a process other than a process for acquiring information relating to the communication environment. The method may include executing the process designated by the user instructions. The method may include acquiring information relating to the communication environment of the information processing apparatus, when the user instructions are received or when the process indicated by the user instructions is executed. The method may include acquiring position information of the information processing apparatus, when the user instructions are received or when the process indicated by the user instructions is executed.

According to a tenth aspect of the present invention, provided is a non-transitory computer-readable medium storing thereon a program for acquiring information relating to a communication environment. The program may cause a computer having a communication function to, while in a state where the program is in a background but not operating, acquire position change information indicating that a positional change amount of the computer has exceeded a predetermined value. The program may cause the computer to, when the position change information has been acquired, transition to a state in which the program operates in the background. The program may cause the computer to, while in a state where the program is operating in the background, acquire the information relating to the communication environment of the computer. The program may further cause the computer to randomly determine a timing within a predetermined period from when the program transitions to a state of operating in a background from a state of operating in a foreground or a state of being in the background but not operating, at which the computer is to perform the process of acquiring the communication environment information.

According to an eleventh aspect of the present invention, provided is a non-transitory computer-readable medium storing thereon a program for acquiring information relating to a communication environment. The program may cause a computer having a communication function to acquire information relating to the communication environment of the computer. The program may cause the computer to acquire position information of the computer. The program may cause the computer to randomly determine a timing within a predetermined period from when the program transitions to a state of operating in a background from a state of operating in a foreground or a state of being in the background but not operating, at which the computer is to perform the process of acquiring the communication environment information.

The summary clause does not necessarily describe all necessary features of the embodiments of the present invention. The present invention may also be a sub-combination of the features described above.

BRIEF DESCRIPTION OF THE DRAWINGS

FIG. 3 schematically shows an exemplary log information data table 300.

FIG. 11 schematically shows an exemplar data table 1100.

DESCRIPTION OF EXEMPLARY EMBODIMENTS

Hereinafter, some embodiments of the present invention will be described. The embodiments do not limit the invention according to the claims, and all the combinations of the features described in the embodiments are not necessarily essential to means provided by aspects of the invention.

Figure 1:
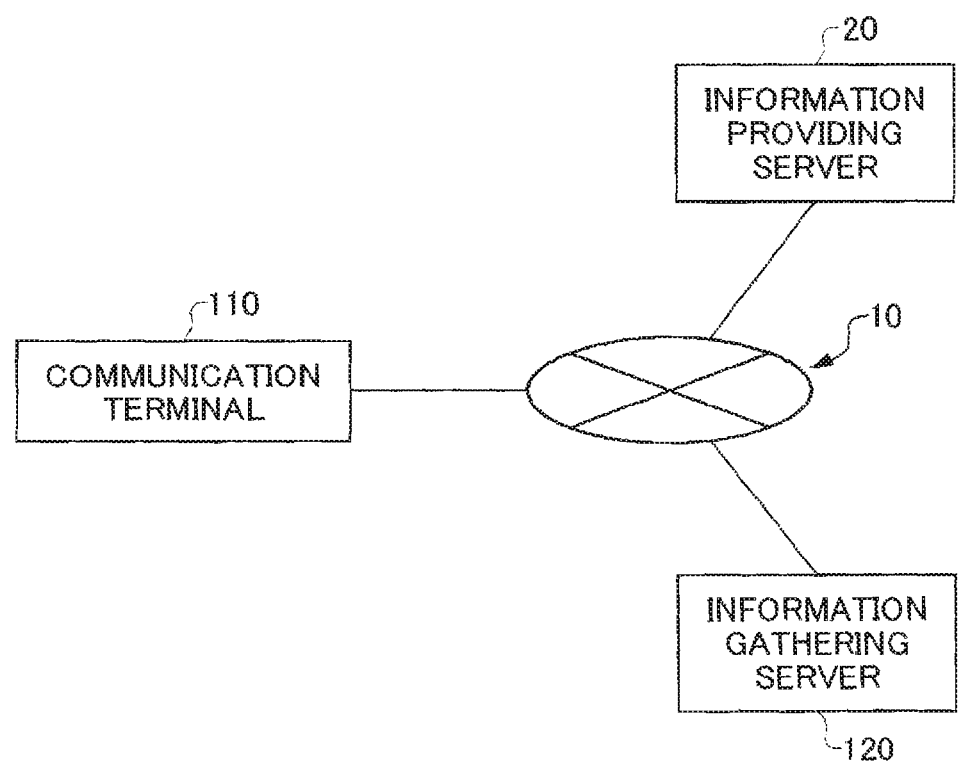
FIG. 1 schematically shows an exemplary communication state analyzing system 100.

FIG. 1 schematically shows an exemplary communication state analyzing system 100. In the present embodiment, the communication state analyzing system 100 includes a communication terminal 110 and an information gathering server 120. The communication state analyzing system 100 and the communication terminal 110 are an example of an information processing apparatus. The communication terminal 110 is an example of a computer that includes a communication function.

The communication terminal 110 and the information gathering server 120 exchange information through a communication network 10. The communication terminal 110 and the information providing server 20 exchange information through the communication network 10. The communication network 10 may be a wireless communication transmission path, or may be a combination of a wireless transmission path and a wired transmission path. The communication network 10 may be a mobile communication network, such as a mobile phone network, a wireless packet communication network, the Internet and a dedicated line, or a combination of these.

The information providing server 20 and the information gathering server 120 may each be realized as an information processing apparatus with a normal configuration that operates according to software or programs that define the operations of each component in the information providing server 20 and the information gathering server 120. The information processing apparatuses used as the information providing server 20 and the information gathering server 120 may include a data processing apparatus having a processor such as a CPU, a ROM, a RAM, and a communication interface; an input apparatus such as a keyboard, touch panel, or microphone; an output apparatus such as a display apparatus or speakers; and a storage apparatus such as a memory or HDD. The data processing apparatus or the storage apparatus may store the software or programs mentioned above. The information providing server 20 and the information gathering server 120 are examples of an information processing apparatus that includes a processor and a storage apparatus that stores the commands or programs to be executed by the processor. The commands or programs are executed by the processor to cause the information processing apparatus to perform the operations defined by the commands or programs.

The information providing server 20 and the information gathering server 120 may each be a virtual server or cloud system. Furthermore, the functions of the information providing server 20 and the information gathering server 120 may be realized by a plurality of servers.

The information providing server 20 provides a service to a user of the communication terminal 110, by providing information to the communication terminal 110 via the communication network 10. The service provided by the information providing server 20 may be an information searching service, a map navigation service, a mail service, a video or audio data distribution service, an electronic document distribution service, or the like. The information providing server 20 receives from the communication terminal 110 a transmission request relating to information designated by the user of the communication terminal 110. The information providing server 20 transmits the information to the communication terminal 110, in response to the transmission request from the communication terminal 110.

The communication terminal 110 has a communication function. The communication terminal 110 may have a wireless communication function. The communication terminal 110 may be capable of using a plurality of communication systems. For example, the communication terminal 110 may be capable of using both mobile communication systems such as 3G, LTE, and 4G and wireless communication systems such as WiFi (Registered Trademark) and WiMAX (Registered Trademark). The communication terminal 110 need only be capable of exchanging information with the information providing server 20 and the information gathering server 120, and may be a wireless terminal, mobile terminal (e.g. a PDA, tablet, notebook computer, or laptop computer), a mobile telephone, or a personal computer with web-browsing software installed.

The communication terminal 110 may be realized by an information processing apparatus with a normal configuration executing software or programs that define the operations of components in the communication terminal 110. The information processing apparatus used as the communication terminal 110 may include a data processing apparatus having a processor such as a CPU, a ROM, a RAM, and a communication interface; an input apparatus such as a keyboard, touch panel, microphone, GPS information acquiring apparatus, acceleration sensor, or gyro sensor; an output apparatus such as a display apparatus, speakers, or a vibrating apparatus; and a storage apparatus such as a memory or HDD. The data processing apparatus or the storage apparatus may store the software or programs mentioned above. The communication terminal 110 is an example of an information processing apparatus that has a communication function and includes a processor and a storage apparatus that stores the commands or programs to be executed by the processor. The commands or programs are executed by the processor to cause the information processing apparatus to perform the operations defined by the commands or programs.

The communication terminal 110 receives user instructions, and performs the process designated by the user instructions. The user instructions may instruct the communication terminal 110 to perform a process other than a process for acquiring information relating to the communication environment. When the user instructions are received, the communication terminal 110 acquires information relating to the communication environment of the communication terminal 110 (sometimes referred to hereinafter as "communication environment information") and position information that indicates the location at which the communication environment information was acquired. When the process designated by the user instructions is performed, the communication terminal 110 may acquire the communication environment information and the position information. The position information may include at least information relating to the communication environment information and the position information. The communication terminal 110 transmits to the information gathering server 120 at least information associated with the communication environment information and the position information (sometimes referred to hereinafter as "log information").

The communication environment information can be exemplified by information relating to communication possibility, radio wave state (e.g. radio wave reception level, radio wave strength, RSCP (Received Signal Code Power), CID (Cell ID)), communication quality (e.g. communication speed, data communication throughput, or data communication latency), communication system, or communication carrier. The communication environment information may include information concerning a network other than information relating to radio waves. The "communication possibility" may be such that communication is not possible (sometimes referred to hereinafter as "communication impossible") when the radio wave level is less than a predetermined level (e.g. when out of range).

The communication possibility may be judged based on a result obtained by repeating, a plurality of times, a process of acquiring information relating to a prescribed radio wave state or communication quality (sometimes referred to hereinafter as a "test"). For example, communication may be judged to be possible (communication possibility) when a ratio of tests indicating that the radio wave state or communication quality is better than a predetermined first threshold value, from among a predetermined number of tests, is greater than a second predetermined threshold value. In other cases, communication may be judged to be impossible.

The log information may be information in which the communication environment information and the position information are associated with at least one of information indicating the time at which the communication environment information was acquired, information indicating the GPS accuracy at the time when the position information was acquired, and information relating to the communication terminal 110. The information relating to the communication terminal 110 can be exemplified by terminal identification information identifying each communication terminal 110, information indicating the type of the communication terminal 110, and information indicating the OS of the communication terminal 110. The information representing the GPS accuracy can be exemplified by an RMS (Root Mean Square), a DRMS (Distance Root Mean Square), a 2DRMS, an RMSE (Root Mean Square Error), a CEP (Circular Error Probability), or the like. The information representing the GPS information may be the radio wave strength of a positioning radio wave from a GPS satellite. The GPS accuracy is an example of positioning accuracy.

The information indicating the time at which the communication environment information was acquired may indicate the time at which the communication terminal 110 began the process for acquiring the communication environment information, the time at which the communication terminal 110 finished the process for acquiring the communication environment information, or the time at which the communication terminal 110 received the user instructions. The terminal identification information is an example of identification information for identifying a computer.

The terminal identification information is not particularly limited as long as it enables identification of each communication terminal 110, and is preferably capable of identifying the communication terminals 110 without specifying a user. In this way, the information gathering server 120 can analyze the log information by referencing the temporal relationship of pieces of log information, without specifying the user.

For example, the terminal identification information of a specified communication terminal 110 may be a randomly selected code sequence. The code sequence may be unique to each of the one or more communication terminals 110, or may be reused among a plurality of communication terminals 110. The terminal identification information may be updated at predetermined intervals, or may be updated at a given timing.

The information gathering server 120 receives the log information from each of the one or more communication terminals 110. The information gathering server 120 may store the received log information in a storage apparatus. The information gathering server 120 may analyze the communication state by using the log information.

Figure 2:
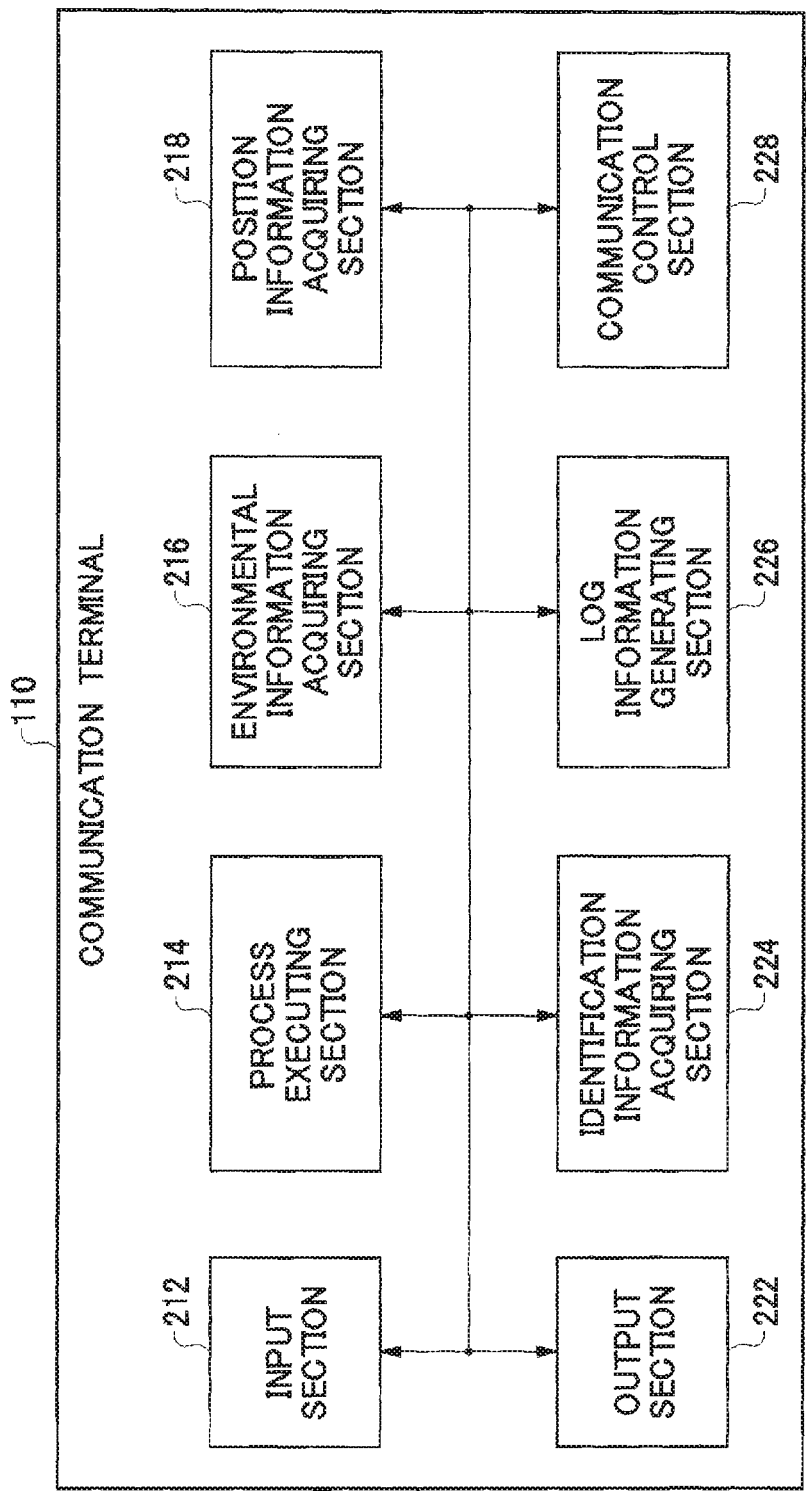
FIG. 2 schematically shows an exemplary communication terminal 110.

FIG. 2 schematically shows an exemplary communication terminal 110. In the description of FIG. 2, portions that overlap with the description relating to FIG. 1 may be omitted. In the present embodiment, the communication terminal 110 includes an input section 212, a process executing section 214, an environmental information acquiring section 216, a position information acquiring section 218, an output section 222, an identification information acquiring section 224, a log information generating section 226, and a communication control section 228. The components of the communication terminal 110 exchange information with each other.

Each component of the communication terminal 110 may be realized by hardware, software, or a combination of hardware and software. By executing a program, a computer may function as a portion of the communication terminal 110. The program may be stored in a computer-readable medium such as a CD-ROM, DVD-ROM, memory, or hard disk, or may be stored in a storage apparatus connected to the network. The program may be installed in the computer of the communication terminal 110 from the storage apparatus connected to the network or the computer-readable medium.

The program that causes the computer to function as a portion of the communication terminal 110 may include a module that defines the operation of each component of the communication terminal 110. These programs and modules work on the processor, communication interface, and GPS information acquiring apparatus, for example, to cause the computer to function as each component of the communication terminal 110 and perform the information processing of the communication terminal 110.

The information process written in these programs is read by the computer and functions as a concrete means by which software and the hardware resources of the communication terminal 110 operate together. With this concrete means, the communication terminal 110 can be constructed for an intended use by realizing computation and processing of information corresponding to the intended use of the computer in the present embodiment.

The input section 212 receives the user instructions from the user. The input section 212 may be a keyboard, touch panel, or microphone. The user instructions instruct the communication terminal 110 to perform a process other than a process for acquiring information relating to the communication environment. Accordingly, instructions requesting only the acquisition of information for measuring line speed or communication speed and instructions requesting only access to a server providing a service for measuring line speed or communication speed are not included in the scope of the user instructions. The input section 212 is an example of a user request handling section.

The process executing section 214 performs the process designated by the user instructions. The process designated by the user instructions may be a process using the communication function, or may be a process that does not use the communication function. The type of process designated by the user instructions may be transmitted to the log information generating section 226.

The process designated by the user instructions may be a process performed at the time when the communication terminal 110 receives the user instructions. The process designated by the user instructions may be a process that is automatically performed at a predetermined time or every time that a predetermined time passes according to the user settings, or may be a process that is automatically performed at a predetermined time or every time that a predetermined time passes according to the initial setting of the communication terminal 110 or the initial setting of the program executed by the communication terminal 110.

The process designated by the user instructions may be a process for outputting information designated by the user instructions in a format that can be understood by the user. Such a process can be exemplified by a process of scrolling through a display screen of the communication terminal 110 and changing the display position of an image shown in the display screen, or a process of accessing the information providing server 20, acquiring information designated by the user from the information providing server 20, and displaying the acquired information in the display screen of the communication terminal 110.

The process designated by the user instructions may be a process associated with the flipping of a switch or the pressing of a button of the communication terminal 110. The process designated by the user instructions may be a process for turning OFF the power supply of the communication terminal 110. The process designated by the user instructions may be a process of logging off from the communication terminal 110, or a process for setting the communication terminal 110 to a sleep state.

When the user instructions are received, the environmental information acquiring section 216 acquires the communication environment information of the communication terminal 110, separately from the process designated by the user instructions. When the process executing section 214 performs the process designated by the user instructions, the environmental information acquiring section 216 may acquire the communication environment information separately from the process designated by the user instructions. The environmental information acquiring section 216 may acquire the communication environment information at a predetermined time or each time that a predetermined time has passed (these timings may be referred to hereinafter as "the communication environment information acquisition timing").

As one embodiment, when the input section 212 receives user instructions that designate activation of a GPS logger, the environmental information acquiring section 216 acquires the communication environment information every time the GPS logger acquires log information at a prescribed time interval. As another embodiment, when the input section 212 receives user instructions that designate activation of e-mail software, the environmental information acquiring section 216 acquires the communication environment information every time the e-mail software accesses the mail server in the background. As yet another embodiment, when the input section 212 receives user instructions that designate setting of a wakeup function, the environmental information acquiring section 216 acquires the communication environment information when the wakeup function is set or when the wakeup function activates.

The environmental information acquiring section 216 issues a request to the information providing server 20 to transmit the information designated by the user, and may then acquire the communication environment information based on the amount of this information and the time needed until the information is acquired from the information providing server 20. The process of acquiring the communication environment information may be performed in the background.

In this way, the communication environment information can be acquired while the user manipulates the communication terminal 110. Furthermore, even when the communication terminal 110 executes a process that does not use the communication function, the communication environment information can be acquired. Yet further, the communication environment information can be acquired without the user performing a prescribed manipulation to acquire the communication environment information. As a result, a communication state close to the actual usage state of the user can be understood over a wide area. Furthermore, the change of the communication state over time can be understood.

When the user instructions are received, the position information acquiring section 218 acquires the position information of the communication terminal 110 separately from the process designated by the user instructions. When the process executing section 214 performs the process designated by the user instructions, the position information acquiring section 218 may acquire the position information separately from the process designated by the user instructions. The position information acquiring section 218 may acquire the position information when the environmental information acquiring section 216 acquires the communication environment information. In this way, the communication environment information can be associated with the position information. The process for acquiring the position information may be performed in the background.

The position information acquiring section 218 may acquire the position information based on at least one of GPS information and radio wave information from an access point of a mobile communication network or a wireless communication network. The position information acquiring section 218 may be a GPS information acquiring apparatus, or may acquire the position information from a GPS information acquiring apparatus provided in the communication terminal 110. The position information acquiring section 218 may acquire information relating to GPS accuracy, along with the position information.

The output section 222 outputs the information designated by the user instructions, in a state that can be understood by the user. The output section 222 may be a display apparatus such as a liquid crystal display or an organic EL display; an audio output apparatus such as a speaker; or a vibrating apparatus such as a vibrator.

The output section 222 may change the image displayed on the screen or change the display position of the image displayed on the screen, for example, in response to the instructions from the user. The output section 222 may display an image based on information from the information providing server 20 via the communication network 10 or on information stored in the storage apparatus of the communication terminal 110. Furthermore, the output section 222 may output from the speaker, as audio information, the information from the information providing server 20 via the communication network 10 or the information stored in the storage apparatus of the communication terminal 110. In this way, the user can understand the information.

On the other hand, when a prescribed process is performed in the background, the information used for this process is not output from the output section 222 in a state that can be understood by the user. Therefore, the user is not aware of this information.

The identification information acquiring section 224 acquires the terminal identification information for identifying each communication terminal 110. The identification information acquiring section 224 may generate the terminal identification information for each communication terminal 110, or may receive the terminal identification information from the information gathering server 120. The terminal identification information may be determined randomly using random numerals. The terminal identification information may be updated at a predetermined time or every time that a predetermined time has passed. The identification information acquiring section 224 may acquire information relating to the communication terminal 110, such as information indicating the type of the communication terminal 110 or information indicating the OS of the communication terminal 110.

The log information generating section 226 may acquire the information relating to the type of process designated by the user instructions from the process executing section 214. The log information generating section 226 may acquire the communication environment information from the environmental information acquiring section 216. The log information generating section 226 may acquire from the environmental information acquiring section 216 information indicating the time at which the communication environment information communication environment information was acquired. The log information generating section 226 may acquire from the position information acquiring section 218 the position information indicating the position at which the communication environment information was acquired. The log information generating section 226 may acquire from the position information acquiring section 218 the information relating to the GPS accuracy at the time that the position information was acquired. The log information generating section 226 may acquire the terminal identification information from the identification information acquiring section 224.

The log information generating section 226 generates the log information. The log information generating section 226 generates the log information at least in association with the communication environment information and the position information. The log information generating section 226 may generate the log information in association with the position information, the communication environment information, and at least one of the information indicating the time at which the communication environment information was acquired, the information indicating the GPS accuracy at the time when the position information was acquired, the information relating to the communication terminal 110, and the information relating to the type of process designated by the user instructions. The process of generating the log information may be performed in the background.

The log information generating section 226 may determine the communication system used when the communication environment information was acquired, based on the information relating the latency of the data communication included in the communication environment information. For example, if the latency is less than a predetermined value, the log information generating section 226 judges that the communication environment information acquired by the environmental information acquiring section 216 was transmitted by the communication terminal 110 using a first communication system, such as LTE or 4G, for example. On the other hand, if the latency is greater than or equal to a predetermined value, the log information generating section 226 judges that the communication environment information acquired by the environmental information acquiring section 216 was transmitted by the communication terminal 110 using a second communication system, such as 3G, for example. The log information generating section 226 may generate the log information by associating the information relating to the communication method used to acquire the communication environment information with the communication environment information and the position information.

The log information generating section 226 may generate an internal function of the OS operating on the communication terminal 110. The log information generating section 226 may determine the communication system used to acquire the communication environment information based on an acquired internal function.

The log information generating section 226 may generate log information each time the input section 212 receives user instructions. The log information generating section 226 may generate the log information each time a process designated by the user instructions is performed. The log information generating section 226 may generate the log information at a predetermined time or every time a predetermined time has passed (sometimes referred to hereinafter as the "log information generation timing"). The log information generation timing may be substantially the same as the communication environment information acquisition timing, or may be different.

The log information generating section 226 may transmit the generated log information to the information gathering server 120. The log information generating section 226 may transmit the log information to the information gathering server 120 every time log information is generated. The log information generating section 226 may transmit the generated to the log information to the information gathering server 120 at a predetermined time or every time a predetermined time has passed (sometimes referred to hereinafter as the "log information transmission timing"). The log information transmission timing may be substantially the same as the log information generation timing, or may be different.

The log information generating section 226 may transmit the generated log information to the information gathering server 120 at least one of the timing at which the communication terminal 110 is activated, the timing at which the communication terminal 110 recovers from the sleep state, and the timing at which the program causing the computer to function as a portion of the communication terminal 110 is activated. The log information generating section 226 may store the generated log information during a period from when log information is transmitted to when the next log information is transferred.

The communication control section 228 controls the communication between the communication terminal 110 and the communication network 10, information providing server 20, and information gathering server 120. The communication control section 228 may be a communication interface. The communication control section 228 may compatible with a plurality of communication systems.

The present embodiment describes an example in which the information gathering server 120 is a server that differs from the information providing server 20, and the communication terminal 110 transmits the communication environment information to the information gathering server 120. However, the communication state analyzing system 100 is not limited to this embodiment. As another embodiment, the communication terminal 110 transmits the communication environment information to the information providing server 20. The information providing server 20 stores the communication environment information received from the communication terminal 110 in a storage apparatus. The information gathering server 120 analyzes the communication state based on the communication environment information stored in the information providing server 20. Furthermore, the functions of the components of the communication terminal 110 are not strictly separated, and the functions of the components in the communication terminal 110 are not limited to those described in the present embodiment.

The above embodiment describes an example in which, when the user instructions designating execution of a process other than a process for acquiring information relating to the communication environment are received, the communication terminal 110 comprehends a communication state near the actual usage state of the user over a wide area, by acquiring the communication environment information and the position information. However, the method for comprehending the communication state near the actual usage state of the user over a wide are is not particularly limited.

As another embodiment, after receiving input from the user designating the start of a process, the communication terminal 110 may automatically acquire information relating to the communication environment at a predetermined time or every time a predetermined time has passed. Since the user does not need to perform the manipulation for acquiring the communication environment information every time the communication environment information is acquired, a communication state close to the actual usage state of the user can be comprehended over a wide area. Furthermore, the change over time of the communication state can be comprehended.

In this case, the communication terminal 110 may transmit the communication environment information to the information gathering server 120 every time the communication environment information is acquired. The communication terminal 110 may store the acquired communication environment information and, according to predetermined conditions, transmit the stored communication environment information to the information gathering server 120. For example, the predetermined condition may be that the number of acquisitions of the communication environment information has reached a predetermined number, the amount of the stored communication environment information has reached a predetermined capacity, a predetermined time has been reached, or a predetermined time has passed. If communication cannot be implemented at the timing at which the communication environment information is to be sent to the information gathering server 120, the communication terminal 110 may store the acquired communication environment information without transmitting it, and then transmit the stored communication environment information at the next transmission timing.

FIG. 3 schematically shows an exemplary log information data table 300. The data table 300 may include the terminal ID 310, information relating to the date and time 320 at which the communication environment information was acquired, the position information 330 indicating the position at which the communication environment information was acquired, information relating to the GPS accuracy 340 at the time when the position information 330 was acquired, and the communication environment information 350. The communication environment information 350 may include information relating to the communication possibility 352, information relating to the data communication throughput 354, and information relating to the data communication latency 356. The terminal ID 310 is an example of identification information that identifies a computer.

In the present embodiment, the terminal ID 310 is a randomly selected code sequence that is updated every other day. In this way, the information gathering server 120 can analyze the log information by referencing the temporal relationship between pieces of log information, without specifying a user.

Figure 4:
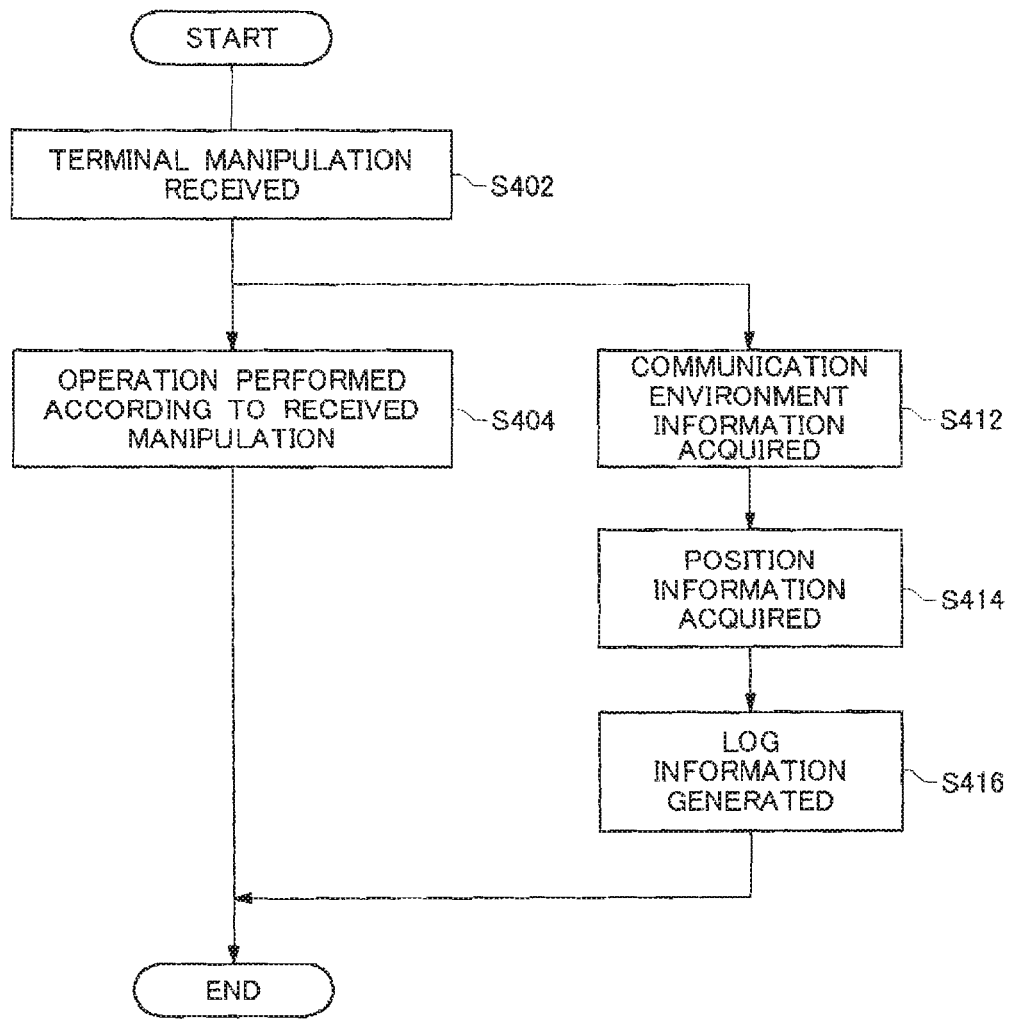
FIG. 4 schematically shows an exemplary operation of the communication terminal 110.

FIG. 4 schematically shows an exemplary operation of the communication terminal 110. FIG. 4 is used to describe an example in which the process designated by the user instructions is a process that does not use the communication function, and the communication terminal 110 generates the log information without accessing the information providing server 20.

With the present embodiment, at step 402 (hereinafter, "step" may be abbreviated as "S"), the input section 212 receives from the user the user instructions relating to a manipulation of the communication terminal 110. For example, the input section 212 receives user instructions for scrolling the screen. At S404, the process executing section 214 performs the process corresponding to the manipulation designated by the user instructions.

On the other hand, at S412, in the background during S404, the environmental information acquiring section 216 acquires the communication environment information. In a case where the process designated by the user instructions does not use the communication function, the environmental information acquiring section 216 acquires information relating to at least the communication possibility. If communication is possible, the environmental information acquiring section 216 may acquire information relating to at least one of the radio wave strength, communication system, and communication carrier.

At step S414, in the background of S404, the position information acquiring section 218 acquires the position information. After step S414, at step S416, in the background of S404, the log information generating section 226 generates the log information, and the process is ended. In the present embodiment, the timing and order of each step can be altered as needed within a range that does not result in any technical contradictions.

Figure 5:
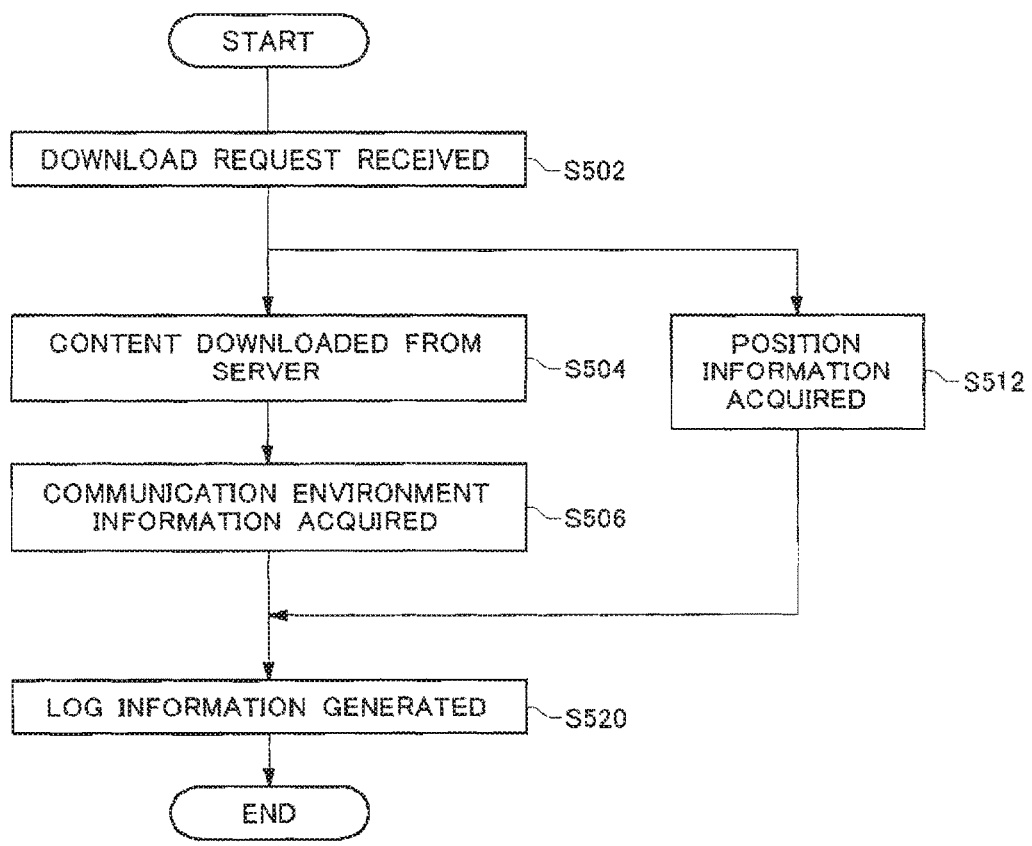
FIG. 5 schematically shows another operation of the communication terminal 110.

FIG. 5 schematically shows another operation of the communication terminal 110. FIG. 5 is used to describe an example in which the process designated by the user instructions is a process that uses the communication function, and the communication terminal 110 generates the log information by accessing the information providing server 20.

In the present embodiment, at S502, the input section 212 receives from the user the user instructions for accessing the information providing server 20 and acquiring the information indicated by the user from the information providing server 20. For example, the input section 212 receives user instructions to acquire information relating to restaurants that match search conditions. At S504, the process executing section 214 performs the process designated by the user instructions, and downloads the corresponding content from the information providing server 20.

At S506, the environmental information acquiring section 216 acquires the communication environment information. The process of S506 may be performed in the background. The environmental information acquiring section 216 acquires at least the information relating to the communication possibility. In a case where the process designated by the user instructions uses the communication function, the environmental information acquiring section 216 may also acquire information relating to at least one of the radio wave state, the radio wave strength, the communication speed, the data communication throughput, the data communication latency, the communication system, and the communication carrier. The environmental information acquiring section 216 may acquire the communication environment information based on the amount of information and the period from when the request for the transmission of the information designated by the user request is made to the information providing server 20 to when this information is acquired from the information providing server 20.

On the other hand, at step S512, in the background of at least one of S504 and S506, the position information acquiring section 218 acquires the position information. After S506 and S512, at S520, the log information generating section 226 generates the log information and the process is ended. The process of S520 may be performed in the background. In the present embodiment, the timing and order of each step can be altered as needed within a range that does not result in any technical contradictions.

Figure 6:
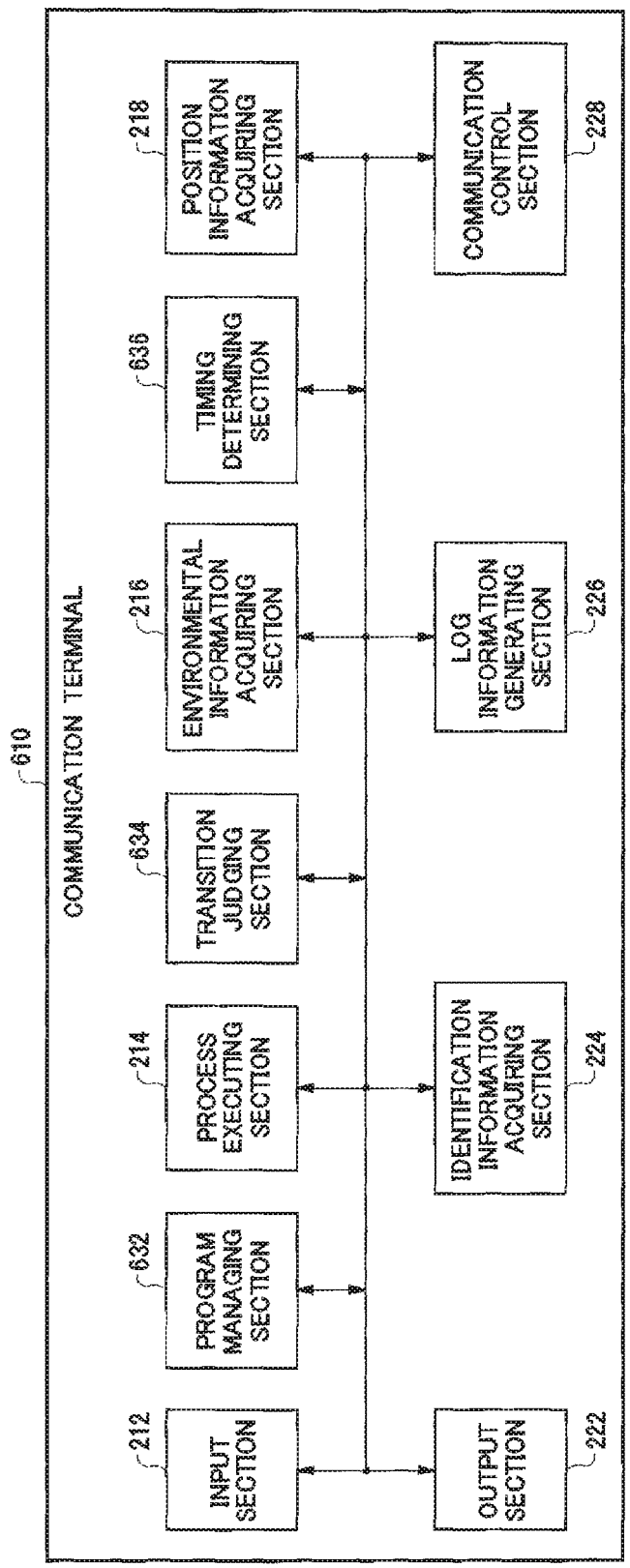
FIG. 6 schematically shows an exemplary communication terminal 610.

FIG. 6 schematically shows an exemplary communication terminal 610. The communication terminal 610 may form a portion of the communication state analyzing system 100 in place of the communication terminal 110 or together with the communication terminal 110. The communication terminal 610 differs from the communication terminal 110 by including a program managing section 632, a transition judging section 634, and a timing determining section 636. The communication terminal 610 may have the same configuration as the communication terminal 110 with respect to all points other than the difference described above.

Concerning the communication terminal 110, it was stated that the environmental information acquiring section 216 may perform the process of acquiring the communication environment in the background and the position information acquiring section 218 may perform the process of acquiring the position information in the background. However, depending on the OS (Operating System) of the communication terminal, there are cases where the operation of programs in the background is limited.

For example, in iOS® manufactured by Apple Inc., there are two activation states respectively for the foreground state and the background state. Specifically, in the foreground state there are two operating states, one of which is a state where a program is in the foreground but is not being used (referred to as "inactive") and the other of which is a state where a program is in the foreground and is being used (referred to as "active"). In the background state there are two operating states, one of which is a state where a program is in the background and still operating (referred to as "background" or "background running") and the other of which is a state where a program is in the background and is not operating (referred to as "suspended").

With iOS, when a predetermined time has passed from after a program transitions to the background running state, the program is forcibly transitioned to the suspended state, except for certain unusual processes. When the program transitions to the suspended state, the program cannot continue processing, and therefore, when the program for realizing the environmental information acquiring section 216 transitions to the suspended state, for example, the process for acquiring the communication environment can no longer be performed in the background.

With the communication terminal 610, an information processing apparatus, method, and program are provided that, even if operation of a program in the background is limited by the OS, can perform the process for acquiring the communication environment when the position of the communication terminal 610 changes by more than a predetermined amount. In this case, the communication terminal 610 may perform the process of acquiring the communication environment in the background.

The components of the communication terminal 610 may be realized by hardware, software, or a combination of hardware and software, in the same manner as the components of the communication terminal 110. By executing a program, a computer may function as a portion of the communication terminal 610. The program may be stored in a computer-readable medium such as a CD-ROM, DVD-ROM, memory, or hard disk, or may be stored in a storage apparatus connected to the network. The program may be installed in the computer of the communication terminal 610 from the storage apparatus connected to the network or the computer-readable medium. The communication terminal 610 is an example of an information processing apparatus that has a communication function and includes a processor and a storage apparatus that stores the commands or programs to be executed by the processor.

The program managing section 632 manages the operating state of the program operating on the communication terminal 610. In the present embodiment, the program managing section 632 manages the operating state of the program for acquiring the information relating to the communication environment of the communication terminal 610. The program for acquiring the information relating to the communication environment of the communication terminal 610 may be a program that causes a computer of the communication terminal 610 to function as at least the environmental information acquiring section 216. The program for acquiring the information relating to the communication environment of the communication terminal 610 may be a program that causes the computer of the communication terminal 610 to function as each component of the communication terminal 610. The program managing section 632 may be a portion of the functions provided by the OS of the communication terminal 610, or an OS module of the communication terminal 610 may function as the program managing section 632 by being read to the computer of the communication terminal 610.

When the information indicating the occurrence of a predetermined type of event is acquired, the program managing section 632 transmits information indicating the occurrence of the event to one or more programs that are in the background and not operating. Upon receiving, from the program that received the above information, a request to change the operating state of this program, the program managing section 632 changes the operating state of the program according to the request. The program managing section 632 is an example of a position change information acquiring section that acquires position change information.

In the present embodiment, when information is acquired indicating that the positional change amount of the communication terminal 610 has exceeded a predetermined value, the program managing section 632 transmits this information or information indicating the acquisition of this information (these types of information are examples of the position change information) to the one or more programs that are in the background and not operating. Upon receiving, from one of the one or more programs that received the above information, a request to change the operating state of the program, the program managing section 632 changes the operating state of the program. In this way, the program for acquiring the information relating to the communication environment of the communication terminal 610 transitions from the state in which the program is in the background and not operating, i.e. the suspended state, to the state in which the program is operating in the background, i.e. the background running state.

The program managing section 632 may acquire the information indicating that the positional change amount of the communication terminal 610 has exceeded the predetermined value from an external server, not shown, via the communication network 10. For example, regardless of the operating state of the program operating on the communication terminal 610, radio waves are received from a base station or access point (sometimes referred to hereinafter as a "base station etc."). The radio waves from the base station etc. include the identification information that identifies the base station or access point. The communication terminal 610 periodically transmits the base station identification information, which is included in the radio waves from the base station, to the server that stores the base station identification information in association with the position information of this base station.

When the positional change of the communication terminal 610 fulfills a predetermined condition, the server transmits to the communication terminal 610 the information indicating that the positional change amount of the communication terminal 610 has exceeded the predetermined value. The program managing section 632 acquires the above information via the communication control section 228, for example. In this way, when the position of the communication terminal 610 changes significantly while power consumption of the communication terminal 610 is being restricted, the operating state of a specified program can be changed.

The present embodiment describes an example in which the program managing section 632 acquires the information that the positional change amount of the communication terminal 610 has exceeded the predetermined value from an external server. However, the program managing section 632 is not limited to this embodiment. For example, the program managing section 632 may acquire the position information of the communication terminal 610 from the position information acquiring section 218, and judge whether the positional change amount of the communication terminal 610 has exceeded the predetermined value. When it is judged that the positional change amount of the communication terminal 610 has exceeded the predetermined value, the program managing section 632 may transmit, to the one or more programs that are in the background and not operating, the information indicating that the positional change amount of the communication terminal 610 has exceeded the predetermined value (this information is an example of the position change information).

The transition judging section 634 receives from the program managing section 632 information indicating that an event has occurred. The transition judging section 634 judges whether to transition the operating state of the program. When the above event included in the received information is a predetermined event for transitioning the operating state of the program, the transition judging section 634 determines that the operating state of the program is to be transitioned. Upon determining that the operating state of the program is to be transitioned, the transition judging section 634 transmits to the program managing section 632 a request to transition the operating state of the program. The transition judging section 634 is an example of a position change information acquiring section that acquires position change information.

In the present embodiment, the transition judging section 634 is a program module for acquiring information relating to the communication environment of the communication terminal 610 and, upon receiving from the program managing section 632 information indicating that a predetermined type of event has occurred, judges whether to transition the operating state of the program for acquiring the information relating to the communication environment of the communication terminal 610. When information indicating that the positional change amount of the communication terminal 610 has exceeded the predetermined value or information indicating the acquisition of such information is included in the information received from the program managing section 632, the transition judging section 634 determines that the operating state of the program for acquiring the information relating to the communication environment of the communication terminal 610 is to be transitioned from a state in which the program is in the background and not operating to a state in which the program is operating in the background.

In the present embodiment, even when the program for acquiring the information relating to the communication environment of the communication terminal 610 is in the background and not operating, the program can be transitioned to a state of operating in the background when the communication terminal 610 has moved a certain distance. In this way, the communication terminal 610 can execute the process for acquiring the information relating to the communication environment in the background.

The timing determining section 636 determines the timing at which the communication terminal 610 executes the process for acquiring the information relating to the communication environment of the communication terminal 610. The timing determined by the timing determining section 636 may be a given timing within a predetermined period from when the program for acquiring the information relating to the communication environment of the communication terminal 610 has transitioned from the foreground state or a state of being in the background and not operating to a state of operating in the background.

The timing determining section 636 may determine the above timing according to predetermined rules. In the present embodiment, the timing determining section 636 may determine the above timing randomly, by using a random number table or a random number generating algorithm. In this way, biasing in the data can be prevented. As another embodiment, the timing determining section 636 stores the determined timing every time the above timing is determined, and may determine the timing such that the time from when the program has transitioned to the background operating state to when the process for acquiring the information relating to the communication environment is acquired follows a predetermined distribution. In this way, biasing of the data can be prevented, and data suitable for the intended use can be gathered.

Figure 7:
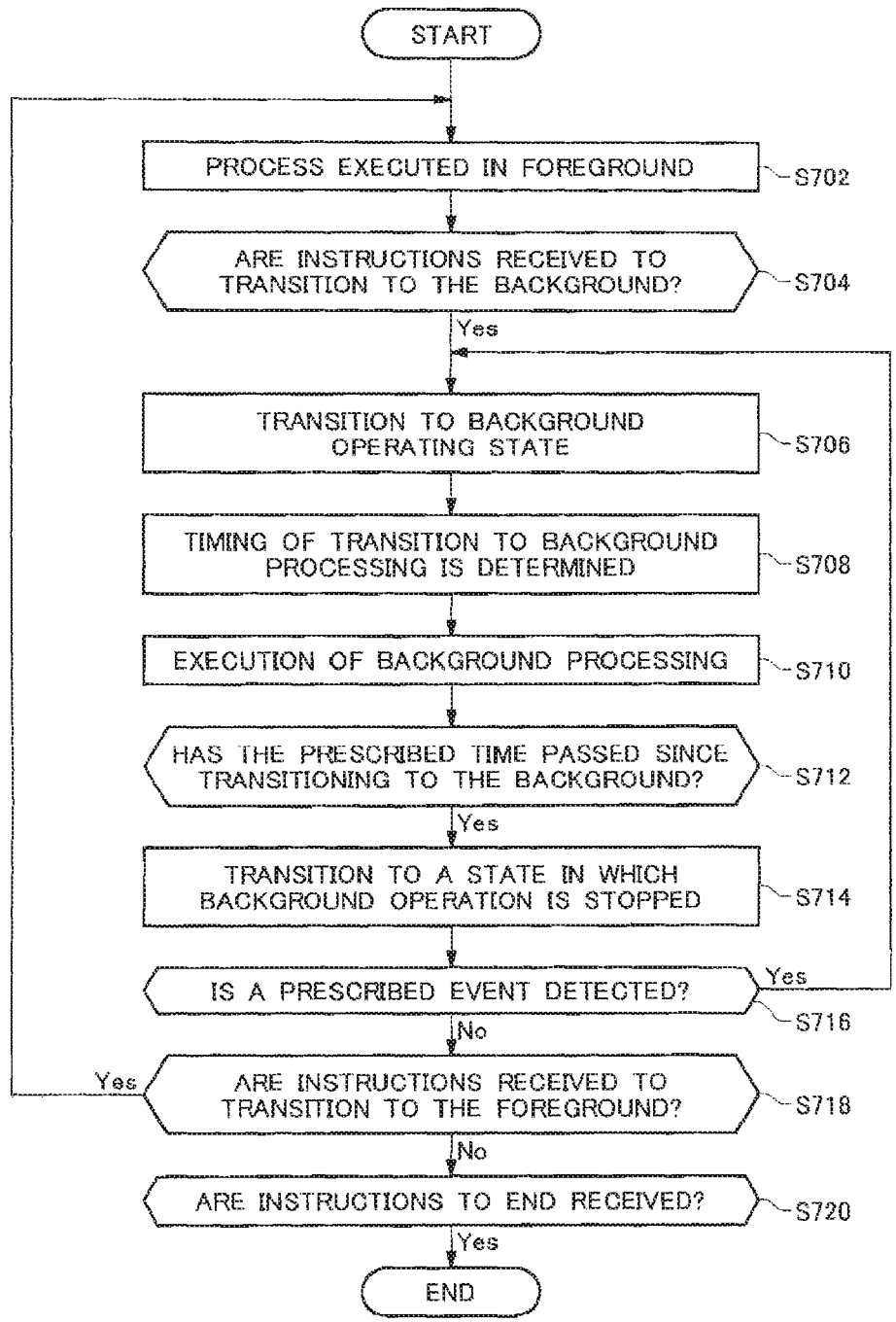
FIG. 7 schematically shows an exemplary operation of the communication terminal 610.

FIG. 7 schematically shows an exemplary operation of the communication terminal 610. The present embodiment describes the operations of the components of the communication terminal 610 using an example in which the program for acquiring the information relating to the communication environment of the communication terminal 610 causes the computer of the communication terminal 610 to function as the input section 212, the process executing section 214, the environmental information acquiring section 216, the position information acquiring section 218, the output section 222, the identification information acquiring section 224, the log information generating section 226, the transition judging section 634, and the timing determining section 636, and the OS of the communication terminal 610 causes the computer of the communication terminal 610 to function as the communication control section 228 and the program managing section 632.

At S702, the program for acquiring the information relating to the communication environment of the communication terminal 610 is performed in the foreground. For example, the input section 212 performs a process for receiving the user instructions. The process executing section 214 performs the process for executing the process designated by the user instructions. The environmental information acquiring section 216 performs the process for acquiring information relating to the communication environment of the communication terminal 610, when the user instructions are received or when the process designated by the user instructions is performed. The position information acquiring section 218 performs the process for acquiring the position information of the communication terminal 610, when the user instructions are received or when the process designated by the user instructions is performed.

At S704, the program managing section 632 judges whether the input section 212 has received transition instructions from the user for transitioning the operating state of the program for acquiring the information relating to the communication environment of the communication terminal 610 to the background. Here, the background state includes both the "background running" state in which the program operates in the background and the "suspended" state in which the program is in the background and not operating.

When the program managing section 632 has judged at S704 that transition instructions have been received from the user (the "Yes" of S704), at S706, the program managing section 632 transitions the program for acquiring the information relating to the communication environment of the communication terminal 610 to the background operating state. At S708, the timing determining section 636 determines the timing at which the environmental information acquiring section 216 is to execute the process for acquiring the information relating to the communication environment of the communication terminal 610.

At S710, the environmental information acquiring section 216 performs the process for acquiring the information relating to the communication environment of the communication terminal 610 in the background, at the timing determined by the timing determining section 636. The communication environment information acquired at S710 can be exemplified by information relating to communication possibility, radio wave state (e.g. radio wave reception level, radio wave strength, RSCP (Received Signal Code Power), CID (Cell ID)), communication system, or communication carrier. The position information acquiring section 218, the identification information acquiring section 224, and the log information generating section 226 may each perform a process at the timing when the environmental information acquiring section 216 performs a process.

At S712, after the program for acquiring the information relating to the communication environment of the communication terminal 610 has transitioned to the background operating state, the program managing section 632 judges whether a predetermined time has passed. If the program managing section 632 determines at S712 that the predetermined time has passed (the "Yes" of S712), at S714, the program managing section 632 transitions the program for acquiring the information relating to the communication environment of the communication terminal 610 to the non-operational background state.

At S716, when the occurrence of a predetermined type of even is detected, the program managing section 632 transmits to the transition judging section 634 information indicating the occurrence of the event. In the present embodiment, the program managing section 632 receives information indicating that the positional change amount of the communication terminal 610 has exceeded a predetermined value, from an external server (not shown) via the communication network 10 and the communication control section 228, and transmits this information or information indicating the acquisition of this information to the transition judging section 634.

The transition judging section 634 acquires the information indicating the occurrence of the predetermined type of event when the program for acquiring the information relating to the communication environment of the communication terminal 610 is in the non-operational background state. When the transition judging section 634 has judged that the event included in the information received from the program managing section 632 is a predetermined event for transitioning the operating state of the program (the "Yes" of S716), the transition judging section 634 transmits to the program managing section 632 a request for transitioning the operating state of the program. The predetermined event for transitioning the operating state of the program may be the positional change amount of the communication terminal 610 exceeding a predetermined value. Upon receiving the request to transition the operating state of the program, the program managing section 632 transitions the program for acquiring the information relating to the communication environment of the communication terminal 610 to the background operating state.

On the other hand, when the transition judging section 634 has judged that a predetermined event for transitioning the operating state of the program has not occurred (the "No" of S716), the process proceeds to S718. At S718, the program managing section 632 judges whether transition instructions for transitioning the program for acquiring the information relating to the communication environment of the communication terminal 610 to the foreground state have been received from the user by the input section 212.

When the program managing section 632 has determined at S718 that transition instructions have been received from the user (the "Yes" of S718), the program managing section 632 transitions the program for acquiring the information relating to the communication environment of the communication terminal 610 to the foreground state. On the other hand, when the program managing section 632 has determined at S718 that transition instructions have not been received from the user (the "No" of S718), the process proceeds to S720.

At S720, the program managing section 632 judges whether the input section 212 has received end instructions for the program for acquiring the information relating to the communication environment of the communication terminal 610 from the user. When the program managing section 632 judges at S720 that the end instructions have been received from the user (the "Yes" of S720), the program managing section 632 ends the program for acquiring the information relating to the communication environment of the communication terminal 610, and the process is finished.

The present embodiment describes an example in which, when the program managing section 632 determines at S704 that the transition instructions have been received from the user, at S706, the program managing section 632 transitions the program for acquiring the information relating to the communication environment of the communication terminal 610 to the background operating state and the communication terminal 610 performs the processes of S708 to S712. However, the operations of the communication terminal 610 are not limited to those described in the present embodiment. As another embodiment, when the program managing section 632 determines at S704 that the transition instructions have been received from the user, the processes of S708 to S712 are skipped, and the program managing section 632 may transition the program for acquiring the information relating to the communication environment of the communication terminal 610 to the non-operational background state.

The following uses FIGS. 8 to 11 to describe an apparatus, method, and program for acquiring log information in which the information relating to the communication environment in an area where it is difficult to receive a positioning radio wave from a GPS satellite or the like is associated with the position information of the position where the information relating to this communication environment was acquired.

When outdoors, it is possible to receive a positioning radio wave from a GPS satellite and recognize the position of a communication terminal 810. In recent years, indoor position measuring technology has been studied for recognizing the position of a communication terminal 810 even in an area where it is difficult to receive positioning radio waves, such as indoors (for example, see Japanese Patent Application Publication No. 2014-013202).

A technique for recognizing the position of the communication terminal 810 indoors is considered that includes, for example, receiving a radio wave or signal for positioning transmitted from a transmitter arranged in an area where it is difficult to receive positioning radio waves from a GPS satellite, and analyzing this radio wave or signal. The signal for positioning may be transferred using a radio wave including light, an ultrasonic wave, or the like. The transmitter for transmitting the signal for positioning can be exemplified by a wireless LAN access point, a Bluetooth (registered trademark) transmitter, an IMES (Indoor MEssaging System) transmitter, an ultrasonic wave transmitter, or the like.

Another technique for recognizing the position of the communication terminal 810 indoors is considered that includes detecting a movement position of the communication terminal 810 using self-contained navigation, based on the output from each type of sensor arranged in the communication terminal 810. The sensors arranged in the communication terminal 810 can be exemplified by at least one sensor selected from a group made up of an acceleration sensor, a gyro sensor, a geomagnetic sensor, and an atmospheric pressure sensor.

However, when recognizing the position of the communication terminal 810 indoors, there are cases where the positioning accuracy is lower than when recognizing the position based on a positioning radio wave from a GPS satellite. Furthermore, in the present embodiment, the information relating to the communication environment of the communication terminal 810 is acquired using the communication terminal 810 of the user. There are cases where the information relating to the communication environment of the communication terminal 810 is relatively unimportant to the user. Therefore, there is a demand for a reduction in the amount of power used for measuring the communication environment.

Figure 8:
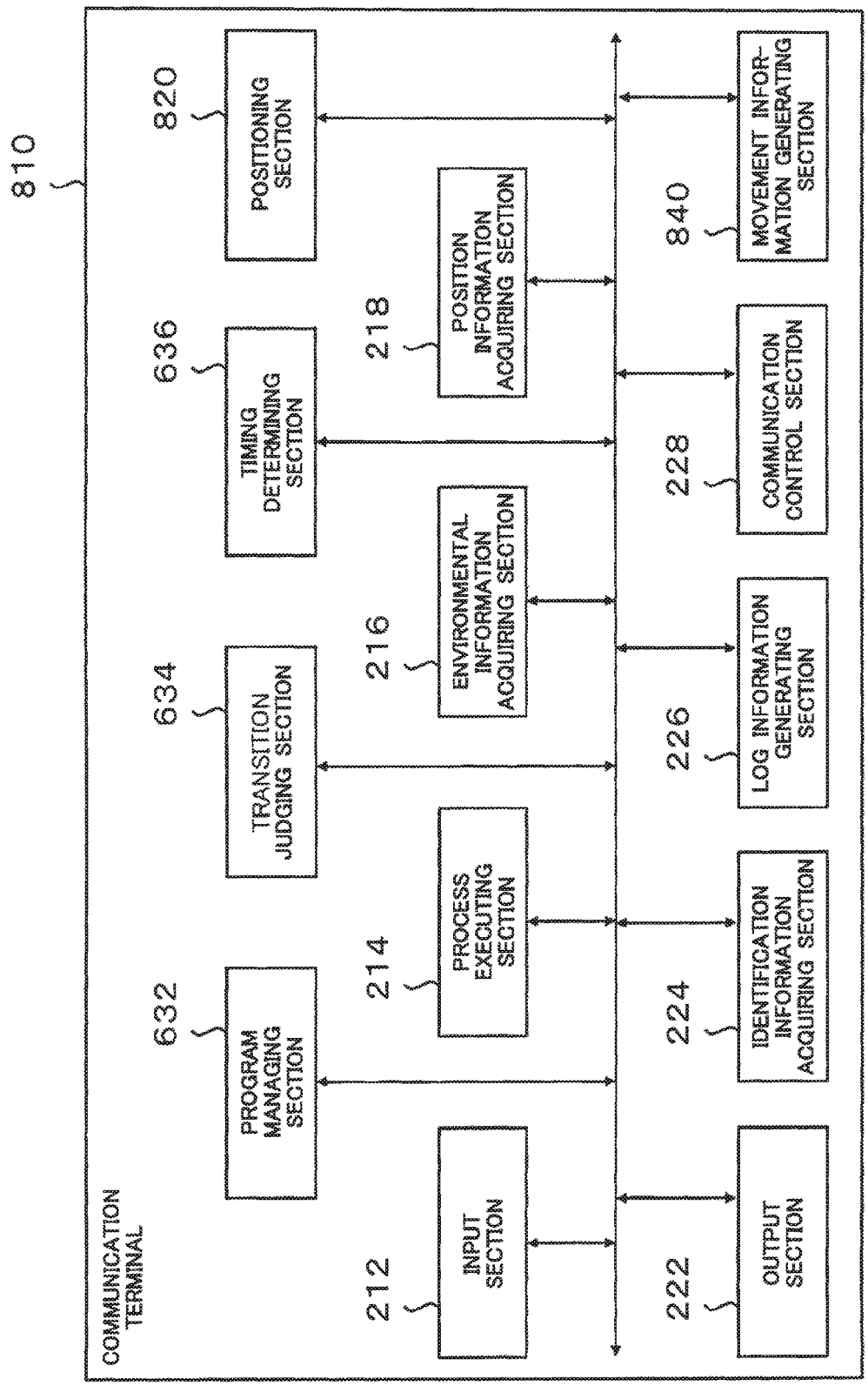
FIG. 8 schematically shows an exemplary communication terminal 810.

FIG. 8 schematically shows an exemplary communication terminal 810. The communication terminal 810 may form a portion of the communication state analyzing system 100 either together with the communication terminal 110 or the communication terminal 610 or instead of the communication terminal 110 or the communication terminal 610. The communication terminal 810 differs from the communication terminal 610 by including a positioning section 820 and a movement information generating section 840. Aside from the point of difference described above, the communication terminal 810 may have the same configuration as the communication terminal 610.

The position information acquiring section 218 may be an example of a position identifying section. The positioning section 820 may be an example of a positioning means. The movement information generating section 840 may be an example of a means for generating movement information.

The present embodiment describes a case in which the communication terminal 810 includes the positioning section 820 and the movement information generating section 840 in addition to each component of the communication terminal 610. However, the communication terminal 810 is not limited to the present embodiment. As another embodiment, the communication terminal 810 may include the positioning section 820 and the movement information generating section 840 in addition to each component of the communication terminal 110.

Each component of the communication terminal 810 may be realized by hardware, software, or a combination of hardware and software, in the same manner as each component of the communication terminal 610. Furthermore, by executing a program, a computer may function as a portion of the communication terminal 810.

The program may be stored in a computer-readable medium such as a CD-ROM, DVD-ROM, memory, or hard disk, or may be stored in a storage apparatus connected to a network. The program may be installed in the computer of the communication terminal 810 from the storage apparatus connected to the network or the computer-readable medium. The communication terminal 810 may be an example of an information processing apparatus that has a communication function and that includes a processor and a storage apparatus that stores commands or a program to be executed by the processor.

In the present embodiment, the positioning section 820 receives the radio wave or signal and measures the position of the communication terminal 810. The positioning section 820 transmits to the position information acquiring section 218 the position information of the communication terminal 810 acquired from the radio wave or signal. The positioning section 820 may acquire information indicating the accuracy of the position information of the communication terminal 810. The information indicating the accuracy of the position information of the communication terminal 810 may be information representing the GPS accuracy. The positioning section 820 can be exemplified by a receiver that receives a positioning radio wave from a GPS satellite, a receiver that receives a radio wave or signal for positioning transmitted from a transmitter, or the like. The transmitter may be installed in an area where it is difficult to receive positioning radio waves from a GPS satellite.

In the present embodiment, the movement information generating section 840 generates movement information indicating the movement amount and movement direction of the communication terminal 810. The movement information generating section 840 transmits the generated movement information to the position information acquiring section 218. The movement information may be information indicating displacement of a position from a reference position. The reference position may be a position where the movement information generating section 840 was activated. The movement information generating section 840 can be exemplified by at least one sensor selected from a group made up of an acceleration sensor, a gyro sensor, a geomagnetic sensor, and an atmospheric pressure sensor. The movement information generating section 840 may include at least one of an acceleration sensor, a gyro sensor, and a geomagnetic sensor.

For example, the movement information generating section 840 calculates the number of steps from the periodic fluctuation in the acceleration detected by the acceleration sensor. The movement information generating section 840 calculates the movement amount by multiplying the calculated number of steps by the predetermined step width of the user of the communication terminal 810. The movement information generating section 840 may calculate the movement amount in a height direction according to the fluctuation in atmospheric pressure detected by the atmospheric pressure sensor. The movement information generating section 840 may determine the movement direction of the communication terminal 810 based on the angular velocity detected by the gyro sensor. The movement information generating section 840 may determine the movement direction of the communication terminal 810 based on the orientation detected by the geomagnetic sensor.

The movement information generating section 840 may generate the movement information when the communication terminal 810 is located in an area where the positioning accuracy of the positioning section 820 is less than a predetermined value (sometimes referred to hereinafter as a "positioning-inaccurate area") or an area where the positioning section 820 cannot perform positioning (sometimes referred to hereinafter as a "positioning-impossible area"). The movement information generating section 840 may stop the process of generating the movement information after the communication terminal 810 has moved from a positioning-inaccurate area or a positioning-impossible area to an area where the positioning accuracy of the positioning section 820 is higher than a predetermined value (sometimes referred to hereinafter as a "positioning-possible area"). In this way, it is possible to reduce power consumption.

In the present embodiment, the position information acquiring section 218 acquires the position information of the communication terminal 810 from the positioning section 820. The position information acquiring section 218 acquires the movement information of the communication terminal 810 from the movement information generating section 840. Furthermore, the position information acquiring section 218 identifies a position where the process for acquiring information relating to the communication environment of the communication terminal 810 has been performed in a positioning-inaccurate area or a positioning-impossible area. The position information acquiring section 218 may identify such a position based on the movement information generated by the movement information generating section 840 and the position information of the communication terminal 810 measured in a positioning-possible area by the positioning section 820 after the communication terminal 810 has moved from a positioning-inaccurate area or positioning-impossible area to the positioning-possible area.

The position information acquiring section 218 may transmit the information indicating the position identified by the process described above to the log information generating section 226, as the position information of the communication terminal 810. The position information acquiring section 218 may transmit the position information measured in a positioning-possible area by the positioning section 820 to the log information generating section 226, as the position information of the communication terminal 810. The log information generating section 226 may generate the log information in which the position information received from the position information acquiring section 218 is associated with the information relating to the communication environment of the communication terminal 810 at the position indicated by this position information.

The present embodiment describes a case in which the position information acquiring section 218 is arranged in the communication terminal 810. However, the position information acquiring section 218 is not limited to the present embodiment. As another embodiment, the position information acquiring section 218 may be arranged in the information gathering server 120.

Figure 9:
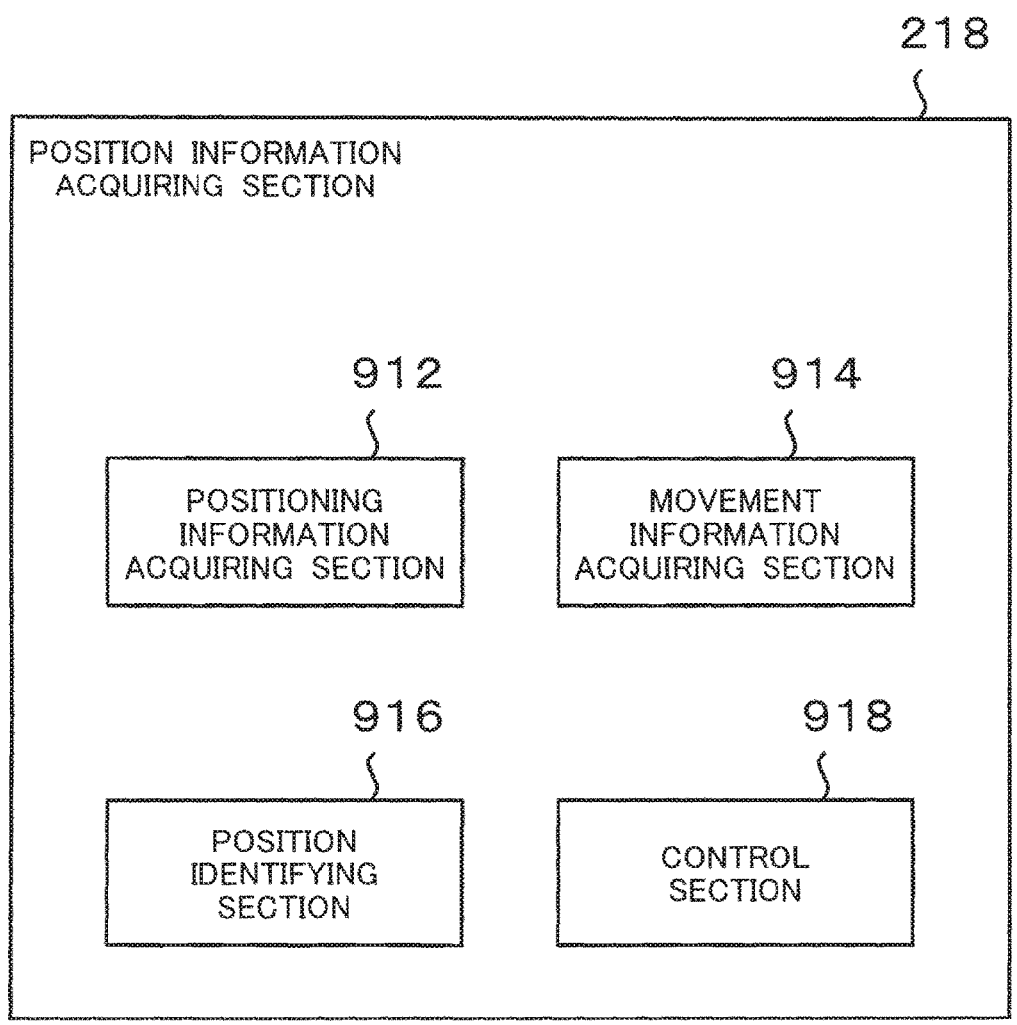
FIG. 9 schematically shows an exemplary position information acquiring section 218.

FIG. 9 schematically shows an exemplary position information acquiring section 218. In the present embodiment, the position information acquiring section 218 includes a positioning information acquiring section 912, a movement information acquiring section 914, a position identifying section 916, and a control section 918.

In the present embodiment, the positioning information acquiring section 912 acquires the position information indicating the position of the communication terminal 810 from the positioning section 820. The positioning information acquiring section 912 may store the acquired position information. The positioning information acquiring section 912 may store the acquired position information in association with the information relating to the timing at which the process for acquiring the information relating to the communication environment of the communication terminal 810 was performed. The positioning information acquiring section 912 may store the acquired position information in association with the information relating to the communication environment acquired at the position indicated by this position information.

In the present embodiment, the movement information acquiring section 914 acquires the movement information indicating the movement amount and movement direction of the communication terminal 810 from the movement information generating section 840. The movement information acquiring section 914 may acquire the movement information at least when the communication terminal 810 is located in a positioning-inaccurate area or a positioning-impossible area. The movement information acquiring section 914 may store the acquired movement information in association with the information relating to the timing at which the process for acquiring the information relating to the communication environment of the communication terminal 810 was performed. The movement information acquiring section 914 may store the acquired movement information in association with the information relating to the communication environment acquired at the position indicated by this position information. The position information acquired by the positioning section 820 at the position where the process for acquiring the information relating to the communication environment of the communication terminal 810 was performed may be stored in association with the movement information generated by the movement information generating section 840 at this position.

In the present embodiment, the position identifying section 916 identifies the position where the process for acquiring the information relating to the communication environment of the communication terminal 810 was performed in a positioning-inaccurate area or a positioning-impossible area. The position identifying section 916 may identify such a position based on the movement information generated by the movement information generating section 840 and the position information of the communication terminal 810 measured by the positioning section 820 in a positioning-possible area after the communication terminal 810 has moved from a positioning-inaccurate area or a positioning-impossible area to the positioning-possible area.

With the present embodiment, the position identifying section 916 identifies a position in a positioning-inaccurate area or a positioning-impossible area by reverse-calculating this position from the position information of the communication terminal 810 measured by the positioning section 820 in a positioning-possible area after the communication terminal 810 has moved from the positioning-inaccurate area or the positioning-impossible area to the positioning-possible area. For example, the position identifying section 916 compares the movement information of the communication terminal 810 at the position indicated by the position information measured by the positioning section 820 in the positioning-possible area to the movement information of the communication terminal 810 at the position where the process for acquiring the information relating to the communication environment of the communication terminal 810 was performed in the positioning-inaccurate area or the positioning-impossible area.

The position identifying section 916 calculates differential information indicating the movement amount and the movement direction of the communication terminal 810, between the position indicated by the position information measured by the positioning section 820 in the positioning-possible area and the position where the process for acquiring the information relating to the communication environment of the communication terminal 810 was performed in the positioning-inaccurate area or the positioning-impossible area. The position identifying section 916 identifies the position where the process for acquiring the information relating to the communication environment of the communication terminal 810 was performed in the positioning-inaccurate area or the positioning-impossible area, based on the differential information described above and the position information of the communication terminal 810 measured by the positioning section 820 in the positioning-possible area.

The control section 918 controls the positioning section 820 and the movement information generating section 840. In the present embodiment, the control section 918 judges whether the communication terminal 810 is located in a positioning-inaccurate area or a positioning-impossible area. The control section 918 may judge whether the communication terminal 810 is located in a positioning-possible area.

For example, when the positioning accuracy of the positioning section 820 is less than a predetermined value, the control section 918 judges that the communication terminal 810 is located in a positioning-inaccurate area. When the positioning section 820 cannot perform positioning, the control section 918 judges that the communication terminal 810 is located in a positioning-impossible area. When the positioning accuracy of the positioning section 820 is higher than a predetermined value, the control section 918 judges that the communication terminal 810 is located in a positioning-possible area.

When the communication terminal 810 is judged to be located in a positioning-inaccurate area or a positioning-impossible area, the control section 918 may set the positioning interval of the positioning section 820 to be greater than when the communication terminal 810 is located in a positioning-possible area. When the communication terminal 810 is judged to be located in a positioning-inaccurate area or a positioning-impossible area, the control section 918 may activate the movement information generating section 840. When the communication terminal 810 is judged to be located in a positioning-possible area, the control section 918 may stop the movement information generating section 840.

In this way, power consumption can be reduced. With the present embodiment, power consumption can be reduced further than in a case where the position of the communication terminal 810 is identified by adding the movement amount indicated by the movement information generated by the movement information generating section 840 to the position information of the communication terminal 810 measured by the positioning section 820 in a positioning-possible area.

Figure 10:
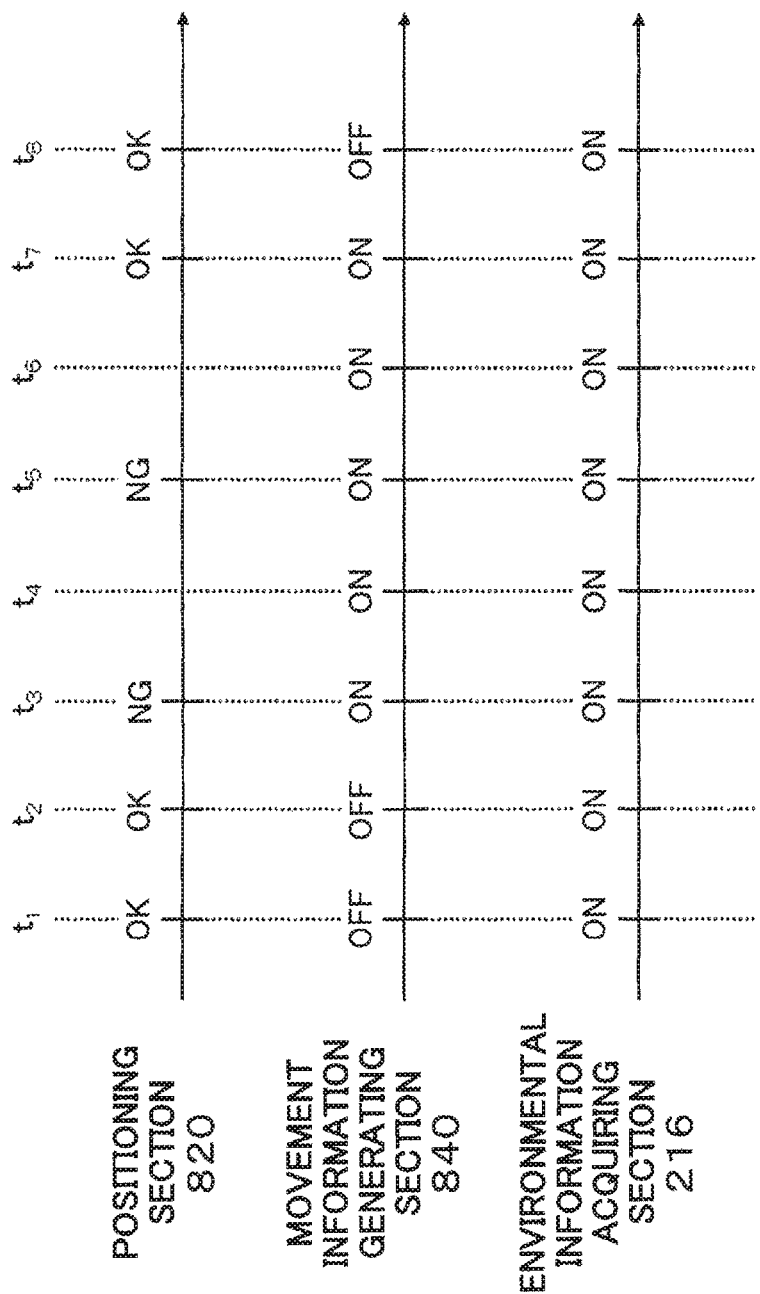
FIG. 10 schematically shows an exemplary operation of the communication terminal 810.

FIG. 10 schematically shows an exemplary operation of the communication terminal 810. FIG. 10 schematically shows exemplary operations of the positioning section 820, the movement information generating section 840, and the environment information acquiring section 216, from a timing $t_1$ to a timing $t_8$. Each timing from the timing $t_1$ to the timing $t_8$ represents a timing at which the environment information acquiring section 216 acquires the information relating to the communication environment of the communication terminal 810.

In the present embodiment, when the environment information acquiring section 216 begins the process for acquiring the information relating to the communication environment of the communication terminal 810 (shown as "ON" in the drawing), the positioning section 820 begins the process of acquiring the position information of the communication terminal 810. When the accuracy of the position information acquired by the positioning section 820 is higher than a predetermined accuracy (shown as "OK" in the drawing), the log information generating section 226 generates log information in which the position information acquired by the positioning section 820 is associated with the information acquired by the environment information acquiring section 216. The environment information acquiring section 216 and the positioning section 820 may be controlled in a manner to be activated a predetermined time before the timing at which the processes for acquiring information are begun. In this way, it is possible to reliably acquire the information.

On the other hand, when the accuracy of the position information acquired by the positioning section 820 is lower than a predetermined accuracy (shown as "NG" in the drawing), the control section 918 activates the movement information generating section 840 (shown as "ON" in the drawing) and increases the positioning interval of the positioning section 820. With the present embodiment, at the timing $t_3$ and the timing $t_5$, the accuracy of the position information acquired by the positioning section 820 is lower than the predetermined accuracy. Furthermore, at the timing $t_4$ and the timing $t_6$, the positioning section 820 need not perform the positioning process. In this way, it is possible to reduce power consumption.

After this, when the positioning section 820 has performed the positioning process at the timing when the processing by the environment information acquiring section 216 is begun, the control section 918 judges whether the communication terminal 810 is located in a positioning-possible area. When it is judged that the communication terminal 810 is located in a positioning-possible area (e.g. at the timing $t_7$ in the drawing), the movement information generating section 840 acquires the movement information at this position and then the control section 918 stops the movement information generating section 840 (shown as "OFF" in the drawing). In this way, it is possible to reduce power consumption. Furthermore, the control section 918 returns the positioning interval of the positioning section 820 to the positioning interval used when the communication terminal 810 is located in a positioning-possible area.

At the timing $t_7$, the position information is acquired by the positioning section 820 and the movement information is generated by the movement information generating section 840. In this way, the position at each timing can be identified by using the position information at the timing $t_7$ and the movement information at each timing. The position identifying section 916 may correct the position at each timing, based on the position at the timing $t_2$ that was reverse-calculated from the position information at the timing $t_7$ and the position indicated by the position information acquired by the positioning section 820 at the timing $t_2$.

FIG. 11 schematically shows an exemplary data table 1100. In the present embodiment, the data table 1100 stores a terminal ID 1110, information relating to the timing 1120 at which the communication environment information was acquired, positioning information 1130, positioning accuracy 1140, movement information 1150, and communication environment information 1160 in association with each other. The data table 1100 may be an example of the information stored by the position identifying section 916. The data table 1100 may be an example of the log information. The positioning information 1130 may be an example of the position information.

The position identifying section 916 can identify the position of the communication terminal 810 at each timing, based on the information stored in the data table 1100. For example, the position identifying section 916 reads the information (sometimes referred to hereinafter as a "record") stored in each row of the data table 1100 and, when the positioning accuracy 1140 of the positioning information 1130 in this record is "good," identifies the position of the communication terminal 810 to be the position indicated by the positioning information 1130.

On the other hand, when the positioning accuracy 1140 of the positioning information 1130 of the read record is anything other than "good," the position of the communication terminal 810 is identified using the movement information 1150 and the positioning information 1130 of this record. For example, assuming the position at the timing $t_5$ to be $(X_5, Y_5, Z_5)$, $X_5$, $Y_5$ and $Z_5$ are each calculated using Expressions 1 to 3 shown below. The positions at other timings can also be calculated in the same manner.

$$X_5 = A_7 - (a_7 - a_5) \qquad \text{Expression 1}$$

$$Y_5 = B_7 - (b_7 - b_5) \qquad \text{Expression 2}$$

$$Z_5 = C_7 - (c_7 - c_5) \qquad \text{Expression 3}$$

The present embodiment describes a case in which the movement information 1150 sets the reference position to be the position of the communication terminal 810 at a timing before the timing $t_1$. However, the movement information 1150 is not limited to the present embodiment. In another embodiment, the movement information 1150 may set the reference position to be the position at the timing $t_3$. In this case, $a_3$, $b_3$, and $c_3$ are 0, and the movement information 1150 at the timings $t_1$ and $t_2$ are not recorded in the data table 1100.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

LIST OF REFERENCE NUMERALS

10: communication network, 20: information providing server, 100: communication state analyzing system, 110: communication terminal, 120: information gathering server, 210: communication terminal, 212: input section, 214: process executing section, 216: environment information acquiring section, 218: position information acquiring section, 222: output section, 224: identification information acquiring section, 226: log information generating section, 228: communication control section, 300: data table, 310: terminal ID, 320: date and time, 330: position information, 340: GPS accuracy, 350: communication environment information, 352: communication possibility, 354: throughput, 356: latency, 610: communication terminal, 632: program managing section, 634: transition judging section, 636: timing determining section, 820: positioning section, 840: movement information generating section, 912: positioning information acquiring section, 914: movement information acquiring section, 916: position identifying section, 918: control section, 1110: terminal ID, 1120: timing, 1130: positioning information, 1140: positioning accuracy, 1150: movement information, 1160: communication environment information

What is claimed is:

1. A mobile communication terminal comprising:
a communication environment information acquiring section that acquires measurement information relating to a communication environment of the mobile communication terminal based on an amount of requested information requested by the mobile communication terminal, and a time needed until the requested information is acquired by the mobile communication terminal from an information providing server that received a request;
a positioning information acquiring section that acquires position information indicating a position of the mobile communication terminal, from a positioning section that receives a radio wave or signal and measures the position of the mobile communication terminal;
a movement information acquiring section that, when the mobile communication terminal is located in a positioning-inaccurate area where positioning accuracy of the positioning section is lower than a predetermined value or in a positioning-impossible area where the positioning section cannot perform positioning, acquires movement information indicating a movement amount and a movement direction of the mobile communication terminal;
a position identifying section that identifies a position in the positioning-inaccurate area or the positioning-impossible area at which the requested information relating to the communication environment was acquired, based on the movement information and the position information that is measured by the positioning section in a positioning-possible area after the mobile communication terminal has moved from the positioning-inaccurate area or the positioning-impossible area to the positioning-possible area, a positioning accuracy of the positioning means being higher than a predetermined value in the positioning-possible area; and
a transition judging section that determines that an operating state of a program for acquiring the measurement information relating to the communication environment of the mobile communication terminal is to be transitioned from a state in which the program is in a background and not operating to a state in which the program is operating in a background when a positional change amount of the mobile communication terminal exceeds a predetermined value.

2. The mobile communication terminal according to claim 1, further comprising:
a log information generating section that generates log information in which information indicating the position identified by the position identifying section is associated with the information relating to the communication environment at the position identified by the position identifying section.

3. The mobile communication terminal according to claim 2, wherein
the log information generating section generates the log information in which the position information measured by the positioning section in the positioning-possible area is associated with the information relating to the communication environment at a position indicated by the position information measured by the positioning section in the positioning-possible area.

4. The mobile communication terminal according to claim 1, wherein the position identifying section:
is adapted to calculate differential information indicating the movement amount and the movement direction of the mobile communication terminal between a position indicated by the position information measured by the positioning section in the positioning-possible area and the position where the information relating to the communication environment was acquired in the positioning-inaccurate area or the positioning-impossible area, based on the movement information at the position indicated by the position information measured by the positioning section in the positioning-possible area and the movement information at the position where the information relating to the communication environment was acquired in the positioning-inaccurate area or the positioning-impossible area, and
is adapted to identify the position where the information relating to the communication environment was acquired in the positioning-inaccurate area or the positioning-impossible area, based on the calculated differential information and the position information measured by the positioning section in the positioning-possible area.

5. The mobile communication terminal according to claim 1, further comprising a control section that:
is adapted to judge whether the mobile communication terminal is located in the positioning-inaccurate area or the positioning-impossible area, and
when it is judged that the mobile communication terminal is located in the positioning-inaccurate area or the positioning-impossible area, is adapted to activate a movement information generating section that generates the movement information indicating the movement amount and the movement direction of the mobile communication terminal.

6. The mobile communication terminal according to claim 5, wherein
the control section, when it is judged that the mobile communication terminal is located in the positioning-inaccurate area or the positioning-impossible area, is adapted to set a positioning interval of the positioning section to be greater than the interval when the mobile communication terminal is located in the positioning-possible area.

7. The mobile communication terminal according to claim 5, wherein the control section:
is adapted to judge whether the mobile communication terminal is located in the positioning-possible area, and
when it is judged that the mobile communication terminal is located in the positioning-possible area, is adapted to stop generating the movement information by the movement information generating section.

8. A non-transitory computer-readable recording medium storing thereon a program that, when executed by a processor of a mobile communication terminal, causes the processor to perform:
a communication environment information acquisition procedure that acquires measurement information relating to a communication environment of the mobile communication terminal based on an amount of requested information requested by the mobile communication terminal, and a time needed until the requested information is acquired by the mobile communication terminal from an information providing server that received a request;
a position information acquisition procedure that acquires position information indicating a position of the mobile communication terminal, from a positioning means that receives a radio wave or signal and measures the position of the mobile communication terminal;
a movement information acquisition procedure that, when the mobile communication terminal is located in a positioning-inaccurate area where positioning accuracy of the positioning means is lower than a predetermined value or in a positioning-impossible area where the positioning means cannot perform positioning, acquires movement information indicating a movement amount and movement direction of the mobile communication terminal;
an identification procedure that identifies a position in the positioning-inaccurate area or the positioning-impossible area at which the communication environment information acquisition procedure was performed, based on the movement information and the position information that is measured by the positioning means in a positioning-possible area after the mobile communication terminal has moved from the positioning-inaccurate area or the positioning-impossible area to the positioning-possible area, a positioning accuracy of the positioning means being higher than a predetermined value in the positioning-possible area; and
a transition judging procedure that determines that an operating state of a program for acquiring the measurement information relating to the communication environment of the mobile communication terminal is to be transitioned from a state in which the program is in a background and not operating to a state in which the program is operating in a background when a positional change amount of the mobile communication terminal exceeds a predetermined value.

9. The non-transitory computer-readable recording medium according to claim 8, wherein the program further causes the processor to:
perform a log information generation procedure that generates log information in which information indicating the position identified by the identification procedure identifying the position where the communication environment information acquisition procedure was performed in the positioning-inaccurate area or the positioning-impossible area is associated with information relating to the communication environment at the position identified by the identification procedure identifying the position where the communication environment information acquisition procedure was performed in the positioning-inaccurate area or the positioning-impossible area.

10. The non-transitory computer-readable recording medium according to claim 9, wherein
the log information generation procedure includes generating the log information in which the position information measured by the positioning means in the positioning-possible area is associated with the information relating to the communication environment at the position indicated by the position information measured by the positioning means in the positioning-possible area.

11. The non-transitory computer-readable recording medium according to claim 8, wherein the identification procedure identifying the position where the communication environment information acquisition procedure was performed in the positioning-inaccurate area or the positioning-impossible area includes:
calculating differential information indicating the movement amount and the movement direction of the mobile communication terminal between the position indicated by the position information measured by the positioning means in the positioning-possible area and the position where the communication environment information acquisition procedure was performed in the positioning-inaccurate area or the positioning-impossible area, based on the movement information at the position indicated by the position information measured by the positioning means in the positioning-possible area and the movement information at the position where the communication environment information acquisition procedure was performed in the positioning-inaccurate area or the positioning-impossible area, and
identifying the position where the communication environment information acquisition procedure was performed in the positioning-inaccurate area or the positioning-impossible area, based on the calculated differential information and the position information measured by the positioning means in the positioning-possible area.

12. The non-transitory computer-readable recording medium according to claim 8, wherein the program further causes the computer processor to:
judge whether the mobile communication terminal is located in the positioning-inaccurate area or the positioning-impossible area, and
when it is judged that the mobile communication terminal is located in the positioning-inaccurate area or the positioning-impossible area, activate a generation means that generates the movement information indicating the movement amount and the movement direction of the mobile communication terminal.

13. The non-transitory computer-readable recording medium according to claim 12, wherein the program further causes the processor to:
    when it is judged that the mobile communication terminal is located in the positioning-inaccurate area or the positioning-impossible area, set a positioning interval of the positioning means to be greater than the positioning interval when the mobile communication terminal is located in the positioning-possible area.

14. The non-transitory computer-readable recording medium according to claim 12, wherein the program further causes the processor to:
    judge whether the mobile communication terminal is located in the positioning-possible area, and
    when it is judged that the mobile communication terminal is located in the positioning-possible area, stop the generation of the movement information by the generation means.

\* \* \* \* \*